US010338987B2

United States Patent
Sawal et al.

(10) Patent No.: US 10,338,987 B2
(45) Date of Patent: Jul. 2, 2019

(54) TESTING MODULE COMPATIBILITY

(71) Applicant: Dell Products LP, Round Rock, TX (US)

(72) Inventors: Vinay Sawal, Fremont, CA (US); Marimuthu Sakthivel, Santa Clara, CA (US); Joseph LaSalle White, San Jose, CA (US)

(73) Assignee: Dell Products LP, Round Rock, TX (US)

( * ) Notice: Subject to any disclaimer, the term of this patent is extended or adjusted under 35 U.S.C. 154(b) by 141 days.

(21) Appl. No.: 15/670,377

(22) Filed: Aug. 7, 2017

(65) Prior Publication Data

US 2019/0042349 A1    Feb. 7, 2019

(51) Int. Cl.
*G06F 11/07* (2006.01)
*G06F 11/36* (2006.01)
*G06F 11/22* (2006.01)

(52) U.S. Cl.
CPC ...... *G06F 11/0781* (2013.01); *G06F 11/3692* (2013.01); *G06F 11/2289* (2013.01)

(58) Field of Classification Search
CPC .. G06F 11/0781; G06F 11/3696; G06F 1/183; G06F 1/184; G06F 1/185
See application file for complete search history.

(56) References Cited

U.S. PATENT DOCUMENTS

| 6,785,142 B1* | 8/2004 | Regimbal | H05K 7/1498 174/16.3 |
| 7,062,545 B1* | 6/2006 | Donkin | G06F 9/4403 709/220 |
| 8,244,918 B2* | 8/2012 | Ahuja | G06F 13/409 710/10 |
| 8,380,883 B2* | 2/2013 | Ahuja | G06F 13/409 710/10 |
| 2009/0313390 A1* | 12/2009 | Ahuja | G06F 13/409 710/2 |

OTHER PUBLICATIONS

Cisco, "Cisco ASR 9000 Series Aggregation Services Router Hardware Installation Guide", First Published: Mar. 2, 2009, Last Modified: May 2, 2016, 318 pages.

(Continued)

*Primary Examiner* — Nadeem Iqbal
(74) *Attorney, Agent, or Firm* — Staniford Tomita LLP

(57) ABSTRACT

A module is tested for compatibility with a chassis without being inserted into the chassis. A platform specification and chassis configuration is obtained. Information about the module is received from an NFC tag attached to the module. The information about the module is analyzed against the platform specification and chassis configuration. Based on the analysis, one of a set of conditions is determined to exist. A first condition exists when the module will not be supported according to the platform specification. A second condition exists when the module will be supported and there are no empty slots for which the module will be compatible with the chassis configuration. A third condition exists when the module will be supported and there is at least one empty slot for which the module will be compatible with the chassis configuration. An indication, perceptible to a user, of a determined condition is generated.

18 Claims, 14 Drawing Sheets

(56) References Cited

OTHER PUBLICATIONS

Cisco, "Cisco ASR 9000 Series Aggregation Services Router Overview and Reference Guide", First Published: Mar. 2, 2009, Last Modified: Nov. 14, 2016, 150 pages.

Cisco, "Cisco Network Convergence System 6000 Series Routers Hardware Installation Guide", Fist Published: Sep. 21, 2013, Last Modified: Jun. 6, 2017, 194 pages.

Davis, Larry, "How to Specify an Equipment Chassis; Card Keying," Dec. 26, 2011, available at <http://www.interfacebus.com/How_to_Specify_an_Equipment_Chassis-Card_Keying.html>, last accessed Aug. 1, 2017, 2 pages.

* cited by examiner

TESTING MODULE COMPATIBILITY

TECHNICAL FIELD

The present invention relates generally to modular information handling systems, and, more particularly, to testing support and compatibility between a module and a chassis.

BACKGROUND

Modular information handling systems such as chassis-based platforms and network switches provide organizations with flexibility to expand capacity and add capabilities as the need arises and to customize according to the needs and preferences of the organization. A chassis includes a number of slots into which various types of modules including various types of line cards, power supply modules, cooling fan modules, processing modules, and so forth may be inserted. A user or administrator can configure a chassis for any number of specific uses by inserting the appropriate modules and setting the appropriate configuration options.

For networking devices, module reusability has been an integral part of bringing new products to the market quickly. For instance, power supply units (PSUs) and fan trays can be interchangeably used between the S4810, S4820, S4840 and S5000 networking switch platforms as provided by Dell, Inc. of Round Rock, Tex. For chassis-based platforms, there are designated slots for specific functional modules such as supervisor cards, port cards, service modules, and so forth. Historically, methods like mechanical slot-key and silk-screen symbols were used to indicate modules supported in the system. This technique, however, fails when a module's compatibility is dependent on what other modules are present in the system.

Use of static module compatibility methods are a major inconvenience at best and at worst can lead to equipment damage, loss of data, loss of efficiency, business disruptions, and increased operating costs. For example, if an incompatible module is inserted in the system, the user has to wait for the system to detect the card, analyze its supportability and provide feedback to the user via a console/syslog. This whole process may take several minutes. In a data center in which there are tens, hundreds, or many thousands of devices, the cumulative time spent diagnosing compatibility issues can span many hours.

Even if a module is supported by the system, there are instances in which it could be incompatible due to the current configuration of the system. For example, in the S5000 platform, fan trays are allowed only in certain slots due to thermal and airflow requirements. If a system has fan trays with a forward airflow profile, inserting a reverse airflow fan tray may be incompatible with the current configuration even though reverse airflow fan trays are supported by the system.

As another example, in some chassis, a certain flavor of an input/output (IOM) module is allowed with following restrictions: if no other IOM is present, any IOM is allowed; if a high-end IOM is present in a slot, no low-end IOM is allowed in adjacent slots. If a low-end IOM is present in a slot, no high-end IOM is allowed in adjacent slots.

As another example, if pre-provisioning is supported (i.e., specific slots are pre-configured for specific module), inserting an unexpected module, albeit supported, will cause a major churn in the processing of that module.

Based on the restrictions discussed above and others, there is a need for providing a dynamic module compatibility detection technique that can not only determine if a card is supported in the system on a given slot but also have the capability to determine the module's compatibility based on the current configuration of the system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
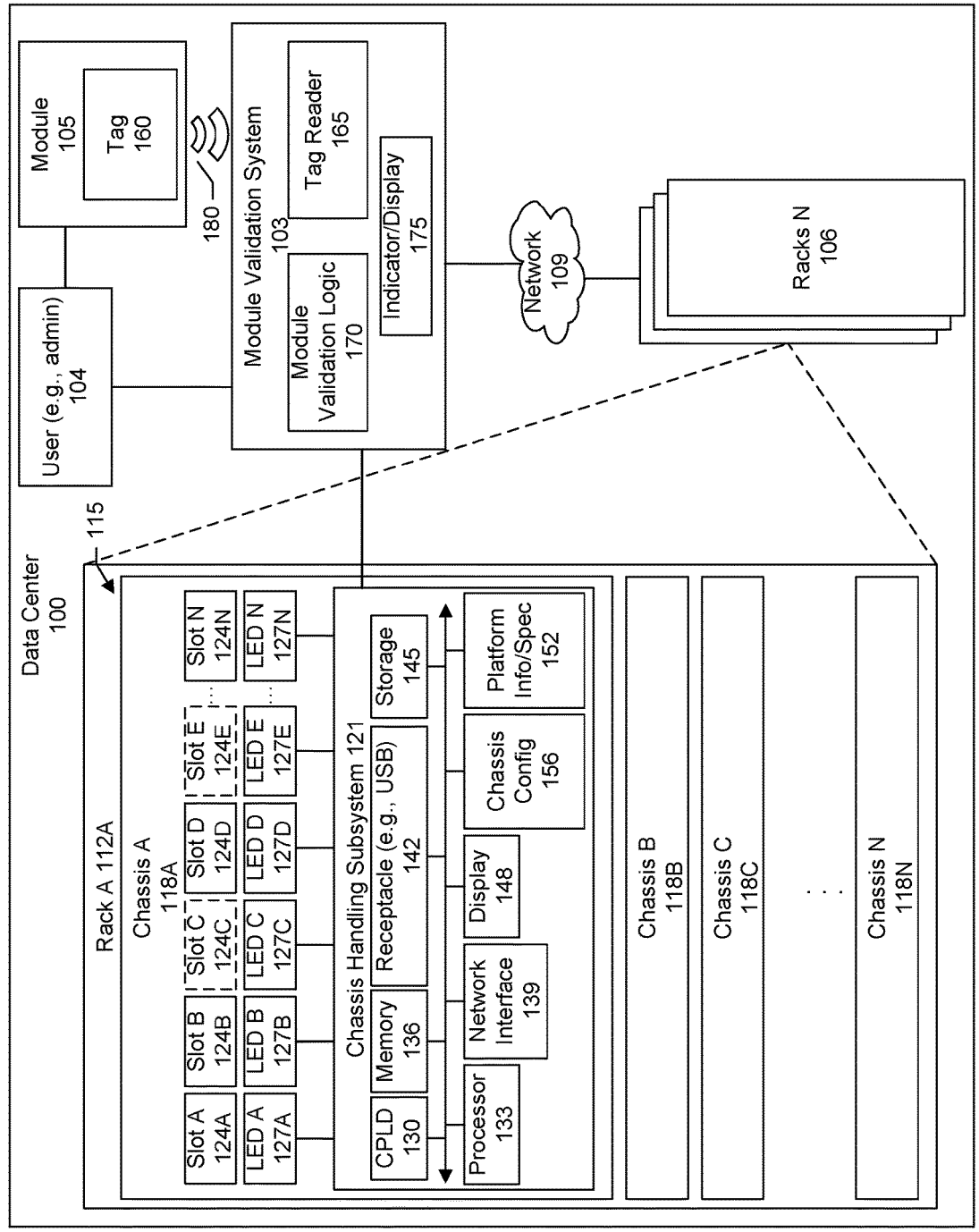
FIG. 1 shows a block diagram of a data center in which a module validation system may be implemented according to a specific embodiment.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. A "non-transitory storage medium" or "non-transitory computer-readable storage medium" may include any media that can contain, store, or maintain programs, information, and data. Examples include physical media such as, for example, electronic, magnetic, optical, electromagnetic, or semiconductor media. More specific examples of non-transitory storage medium or non-transitory computer-readable storage medium include a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

Applications, software programs or computer-readable instructions may be referred to as components or modules. Applications may be hardwired or hard coded in hardware or take the form of software executing on a general purpose computer having a processor or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for validating or testing a module and, more specifically, checking the support and compatibility between a module and a chassis. In an embodiment, systems and techniques are provided for checking module compatibility and identifying valid slot locations of a chassis. FIG. 1 shows a block diagram of a data center 100 in which a module validation system 103 may be implemented. The module validation system can inform a user 104 as to whether or not a module 105 will be supported and compatible in a chassis 118A before the user inserts the module into the chassis. That is the module can be tested without having to insert the module into the chassis. The user may be an administrator, data center technician, or data center operator.

It can be difficult and time-consuming for a user to know whether or not a module is supported and compatible with a chassis because there are many different types of chassis platforms and systems, many different combinations in which hardware of the chassis may be configured, many different combinations in which software of the chassis may be configured, many different types of modules, different revisions, versions, and releases of hardware, software, firmware, and so forth. In some cases, even though a module might be able to be physically inserted into the chassis, the module may not be supported by the chassis platform or be compatible with a current or preconfigured configuration of the chassis. In other cases, a module may be supported by the chassis platform, but not compatible with the current or preconfigured hardware or software configuration of the chassis. The on-going development and release of new software and hardware products for chassis and modules adds further complexity and user confusion because new products may or may not be backwards compatible.

Being able to know whether or not a particular module is supported and compatible with a particular chassis (and the valid slot locations) without inserting the module into the chassis can facilitate data center maintenance, reduce the time required to upgrade a particular chassis with a new module, reduce the frustration of inserting a module into a chassis and then discovering much later that the module is not compatible, and prevent damage to equipment from using incompatible and unsupported modules.

In a specific embodiment, a system and a method is provided that incorporates the dynamic attributes of a modular chassis along with its static characteristics to determine the compatibility of a module for a given chassis. In a specific embodiment, the attributes include:

1) Hardware restrictions dictated by the chassis.
2) Additional software restrictions that are dependent on:
2a) Initial provisioned configuration (e.g., pre-provisioned system)
2b) Current system state Problems such as inserting a reverse airflow fan-tray in an otherwise forward airflow system can have detrimental effect on the working of the system and even the data center itself. Likewise, plugging in unsupported modules in flex slots and expecting them to come up or operate can cause a poor user experience. Prior approaches fail to address these issues of determining module compatibility based on all factors. In a specific embodiment, all factors are taken into account in determining and then indicating module support and compatibility to a user before the user inserts the module into the chassis. In other words, whether or not the module is supported and compatible can be determined or tested while the module remains outside of the chassis, is not present inside the chassis, or is not plugged in.

After the results of the test have been indicated to the user, the user will have the knowledge to proceed confidentially with any number of actions. For example, if the module is fully compatible (e.g., supported by the chassis platform and compatible with the current or preconfigured hardware and software configuration), the user may proceed with inserting the module into the chassis. If the module is supported by the chassis platform, but not compatible with the current or preconfigured software configuration, the user may adjust the software configuration (e.g., install additional software component, upgrade to later version, or downgrade to earlier version) and then insert the module (or vice-versa).

If the module is supported by the chassis platform, but not compatible with the current hardware configuration, the user may adjust the hardware configuration. Some examples of adjustments may include removing an existing module from a slot that may be causing compatibility issues, relocating an existing module to a different slot and then inserting the module (or vice-versa), acquiring a later revision of the module, acquiring an earlier revision of the module, and so forth. If the module is not supported by the chassis platform, the user may select a different module.

As shown in the example of FIG. 1, the data center includes any number of racks 106. The rack, components of the rack, or both may be connected to a network 109. A data center rack is a physical and electronic framework or cabinet designed to house computing equipment such as rack-mounted or blade servers, networking equipment, telecommunication equipment, cooling equipment, power supply equipment, switches, and so forth. A size of a rack may be expressed as a number of rack units (RUs). A rack unit is a unit of measure defined as 1.75 inches (44.45 mm). It can be used as a measurement of the overall height of 19-inch and 23-inch rack frames, as well as the height of equipment that mounts in these frames. That is, the height of the frame or equipment may be expressed as multiples of rack units. For example, a typical full-size rack cage is 42 U high, while equipment is typically 1 U, 2 U, 3 U, or 4 U high.

Specifically, a rack, such as a rack 112A, may include a set of bays 115 to hold a set of rack units, boxes, switches, or chassis 118A-N. A chassis, such as chassis 118A, may include a chassis handling subsystem 121, a set of slots 124A-N, and a set of beacon light emitting elements (e.g., light emitting diodes (LEDs)) 127A-N associated with the set of slots.

The chassis may be constructed from steel, aluminum, plastic, or any other suitable material or combination of materials. The chassis forms an enclosure that serves as a container or housing for various computing components or resources. The chassis can help to protect the internal equipment from dust, moisture, and tampering.

The slots in the chassis form openings through which various pluggable modules can be inserted into and removed from the chassis (e.g., plugged into and unplugged from the chassis). Some examples of modules include power supply units (PSUs), alternating current (AC) power module, direct current (DC) power module, fan trays, I/O modules (TOM), supervisor cards, line cards, service cards, small form-factor pluggable (SFP) modules (e.g., Ethernet SFP, Fiber Channel (FC) SFP), route processor (RP) cards, and route switch processor (RSP) cards, among others. These pluggable modules provide flexibility to allow data center operators, service providers, and enterprises to adapt to changing needs quickly and cost-effectively. For example, as an enterprise expands, new modules may be added to an existing chassis.

The modules, upon insertion into their respective slots, may be communicatively or electrically connected to the chassis handling subsystem for operation, control, and management. Specifically, the chassis handling subsystem may include a backplane or other circuit board having sockets into which a module is inserted. A controller of the chassis handling subsystem may be configured to detect the inserted module, issue commands, signals, or both to the module; receive commands, signals, or both from the module, and so forth.

In particular, the handling subsystem may include a complex programmable logic device (CPLD) 130, processor 133, memory 136, network interface 139, receptacle (e.g., USB receptacle, port, or slot) 142, storage 145, display 148 (e.g., liquid crystal display (LCD)), platform specification 152, chassis configuration 156, buses, motherboards, electro-mechanical devices, input/output (IO) interfaces, storage devices, interfaces, motherboards, backplanes, midplanes, electro-mechanical devices (e.g., fans), connection interfaces, management controllers, microprocessors, microcontrollers, digital signal processor (DSP), application-specific integrated circuits (ASIC), field-programmable gate arrays (FPGA), electrically erasable programmable read-only memory (EEPROM), or power supplies, among others, or combinations of these. The chassis handling subsystem may include a display through which a user may access various management and configuration functions. Instead or additionally, the chassis handling subsystem may provide a management console or user interface (e.g., graphical user interface (GUI) or command line interface (CLI)) that the user can access remotely such as via a Secure Shell protocol (SSH) or other suitable protocol.

In an embodiment, the platform specification refers to a system level configuration that may be set by the vendor of the chassis. The platform specification or platform information may be referred to as a static configuration as it is generally not user-configurable. The information in the platform specification may identify specific module types, specific module vendors, associated configurations, revisions, or combinations of these which have been certified for use in the chassis by a vendor or manufacturer of the chassis. There can be any number of reasons why a particular module may not be supported by a chassis or supported only under particular conditions.

For example, the chassis vendor or manufacturer may not have tested the particular module for use with the chassis. The chassis vendor may have tested the particular module and discovered errors in the operation. The chassis vendor may have designed their chassis to accept only modules of a particular type. The chassis vendor may have tested their chassis using only modules from a particular module manufacturer. And so forth. In short, based on the results of the testing, the chassis vendor may certify certain modules that will work as intended in the chassis.

Thus, the platform specification or information may specify, for example, identifications of module types that may be supported (e.g., type A, B, and C modules supported), restrictions on the types of modules supported (e.g., type K and L modules not supported), identifications of slots in which particular module types are supported (e.g., type D modules supported in only slots 2, 3, and 5), identifications of slots in which particular module types are not supported (e.g., type O modules not supported in slot 7), dependencies or relationships between module types (e.g., type A modules supported only when a type B module is also present, or type C module not supported when a type D module is present), identification of module manufacturers whose modules are supported (e.g., modules provided by module manufacture Y supported), module dependencies or relationships with respect to slot locations, identification of module manufacturers whose modules are not supported (e.g., modules provided by module manufacture Z not supported), module revision restrictions (e.g., only modules of a particular revision supported, or all installed modules must be of the same revision), maximum number of a particular module type, serial numbers, part numbers, media access control address (MAC address), product revision, security settings, system level software, and the like.

The chassis configuration refers to the user-configurable hardware and software of the chassis. In other words, the chassis configuration may include restrictions that are defined by a customer of the chassis vendor. The chassis configuration may be referred to as a current configuration and may include current hardware configurations, current software configurations, pre-provisioning configurations, or combinations of these. In other words, the configuration corresponds to dynamic attributes of the chassis. For example, the current hardware configuration may identify modules that are currently present or installed in the chassis (e.g., modules A, K, and J currently installed), the slots in which the modules have been placed (e.g., module A inserted into slot 3, module K inserted into slot 4, and module J inserted into slot 8), slots that are empty or unoccupied (e.g., slots 1, 2, 5, 6, and 7 currently empty), other user-configurable hardware options, and so forth.

In the example shown in FIG. 1, slots 124C and 124E are empty as indicated by the broken lines. In other words, no modules have been inserted into slots 124C and 124E. Slots 124A, 124B, and 124D are occupied as indicated by the sold lines. In other words, modules have been inserted or are currently present in slots 124A, 124B, and 124D.

The current software configuration may specify Internet Protocol (IP) address assignments, default gateways, passwords, management port IP addresses, privilege levels, event log options, file services, filters, border gateway protocol (BGP) parameters, current software configuration of the inserted modules, and the like. Current configuration information may be referred to as a running configuration that may be used to configure the system during boot-up. This configuration information may be stored to internal flash storage, a USB flash device, or remote server.

The pre-provisioning configurations may include configuration settings for modules that have not yet been inserted into the chassis. For example, there can be a configuration template that an administrative user can use to pre-define certain settings, parameters, restrictions, rules, or the like for modules that may potentially be inserted into a chassis. An administrative user may use the template to define a standard configuration of a chassis for the organization. In particular, the template may identify modules that, although supported by the platform, should not be inserted into the chassis (e.g., module blacklist), identify modules that are allowed to be inserted into the chassis (e.g., module whitelist), specify certain slots for certain modules, limit the types of modules that may be inserted into the chassis, define the conditions under which particular modules may or may not be inserted, define various option settings for a module, and so forth.

Even though a chassis might support a particular module, an organization may not want that particular module to be used or that particular module to be used in combination with one or more other modules. For example, the organization may determine that the module does not meet the organization's internal performance standards. The administrative user may then define a configuration template that includes a listing of modules that are not allowed to be used. Conversely, the organization may determine that only certain modules should be used. The administrative user may define a configuration template that includes a listing of modules that are allowed to be used and configuration settings for each of the allowed modules. A predefined configuration setting may then be applied when an allowed module is inserted into the chassis.

The template allows for a chassis to be pre-provisioned and facilitates deployment and scaling. A chassis may be pre-provisioned without there being any hardware (e.g., modules) present so that when a module is actually inserted, little or no additional configuration will be needed. Templates can be reused to pre-provision any number of chassis. As the organization expands and desires additional capacity, a new module may be purchased and inserted into an existing chassis without having to also make other adjustments or configuration changes to accommodate the newly inserted module. Configuration templates may be stored in a central configuration database. When a chassis is to be configured, the administrative user may select the desired configuration template to be applied to the chassis. The selected configuration template may then be copied to the chassis and stored locally at the chassis.

As another example, pre-provisioning or preconfiguring a chassis or switch can help to ensure proper airflow throughout the chassis and ultimately the data center itself. Airflow is an important consideration in the proper maintenance of data center equipment and temperatures. Maintaining a layout or floor plan of hot aisle/cold aisle can help to conserve energy and lower cooling costs by managing airflow. Thus, inserting a reverse airflow fan-tray into a chassis or switch when the layout design specifies a forward airflow can not only damage the switch itself, but can also increase cooling costs or cause damage to other equipment.

Thus, the proper operation and functioning of a chassis or switch may be subject to any number of different restrictions or requirements associated with, for example, slot locations, module types, module revisions, chassis configuration, platform specification, and so forth. There can be dependencies, conditions, or relationships among the restrictions and requirements. These restrictions, requirements, and their associated dependencies, conditions, or relationships may be defined in the platform information for the chassis, chassis configuration information, or both. The platform and configuration information may be stored in any suitable data structure such as, for example, a database, text file, Extensible Markup Language (XML) file, and others.

The set of beacon lighting elements (e.g., LEDs) may be connected to the chassis handling subsystem. A particular beacon LED may be associated with a particular slot. For example, beacon LED A 127A may be coupled to a surface of the chassis and positioned next to or adjacent to its associated or corresponding slot 124A. Beacon LED B 127B may be coupled to the surface and positioned next to or adjacent to its associated or corresponding slot 124B. Beacon LED C 127C may be coupled to the surface and positioned next to or adjacent to its associated or corresponding slot 124C. Beacon LED D 127D may be coupled to the surface and positioned next to or adjacent to its associated or corresponding slot 124D. And so forth.

The beacon LEDs provide a visual identification of a particular slot. For example, in many cases, the chassis surface areas surrounding the slots may not have sufficient space to label or mark each individual slot. Further, there can be different ordering schemes for the slots depending upon the vendor of the chassis. For example, some vendors may order their slots left to right. Other vendors may order their slots right to left, and so forth. Thus, to identify a particular slot (e.g., slot number 3), the user may access a management interface of the chassis (e.g., GUI or CLI) and select an option to activate a beacon LED associated with the particular slot. The beacon LED for the particular slot will be lit so that the user can visibly identify the slot. Typically, a beacon LED will be of a single color (e.g., blue).

The module includes a tag 160 associated with the module. The tag may be attached (e.g., glued, taped, mechanically fixed, printed, or embedded) to a surface of the module. The tag may include a proximity tag or contactless tag that uses radio frequency (RF) for communication. In a specific embodiment, the tag includes a Near Field Communication (NFC) tag. The NFC tag stores information about the particular module that it is attached to. The information may include module capabilities, module specifications, identifying information (e.g., media access control (MAC) address), hardware specifications, software specifications, type of module, module manufacturer details, release details, and the like. The information stored in a tag may vary widely depending upon the module type.

For example, a module may include a line card. A line card provides an interface to a network. A line card can terminate a line supporting voice POTS service, ISDN service, DSL service, or proprietary ones. In this example, an associated tag may identify the module as a line card, indicate support for Ethernet, indicate support for Fibre Channel (FC), identify the number of ports provided (e.g., 16 ports, 24 ports, 32 ports, or 48 ports), identify the speed of the ports (e.g., 10 GB or 40 GB), and so forth.

NFC tags are relatively inexpensive passive devices. They thus operate without a power supply of their own and rely on an active device to come into range before they are activated. In order to power NFC tags, electromagnetic induction is used to create a current in the passive device. Generally, NFC is designed to operate over a relatively short distance (e.g., about 1, 2, 3, or 4 inches; or about 1, 2, 3, or 4 centimeters). The distance may be less than 1 centimeter or greater than 4 centimeters.

NFC tags are paper-thin passive devices with extremely small form factors that do not require a power source to work. These tags are available in a variety of flavors including field programmable persistent storage. Some tags have one-time programmable ROM storage. No matter which type of tag is used, in an embodiment, one or more of the following immutable data or relevant parts may be populated into NFC tags during the tag manufacturing process:

1) Globally unique device identifier (ID), serial number, product id, revision number, and the like.

2) Module capability: Depending on the modules type this may include items such as:

2a) PSU/Fan tray: max power output, fans, max rpm, forward/reverse airflow.

2b) Supervisor card: type, mem size, supported features.

2c) Line/Port card: number of ports, port speeds, mac-address range.

In a specific embodiment, the module validation system includes a tag reader 165, module validation logic 170, and an indicator display 175. The tag reader is responsible for obtaining information about the module from the tag attached to the module. In a specific embodiment, the tag reader includes an NFC reader or chip. The NFC reader generates a magnetic field that activates a corresponding NFC tag on a module. The module information stored in the tag can then be transmitted wirelessly 180 from the module to the tag reader.

In a specific embodiment, the module validation logic includes logic to receive the module information from the tag reader, obtain platform specification or platform information about the chassis, and obtain a configuration of the chassis. The configuration information may include a pre-provisioned configuration and a current hardware and software configuration. In a specific embodiment, the validation logic determines a compatibility condition of the module for each of the empty or unoccupied slots in the chassis by comparing the module information against the chassis platform information and chassis configuration.

The determined compatibility condition is provided to the indicator display unit. The indicator display unit is responsible for generating one or more indications of the determined compatibility condition so that the user can perceive (e.g., see) the results of the compatibility check or test.

Figure 2:
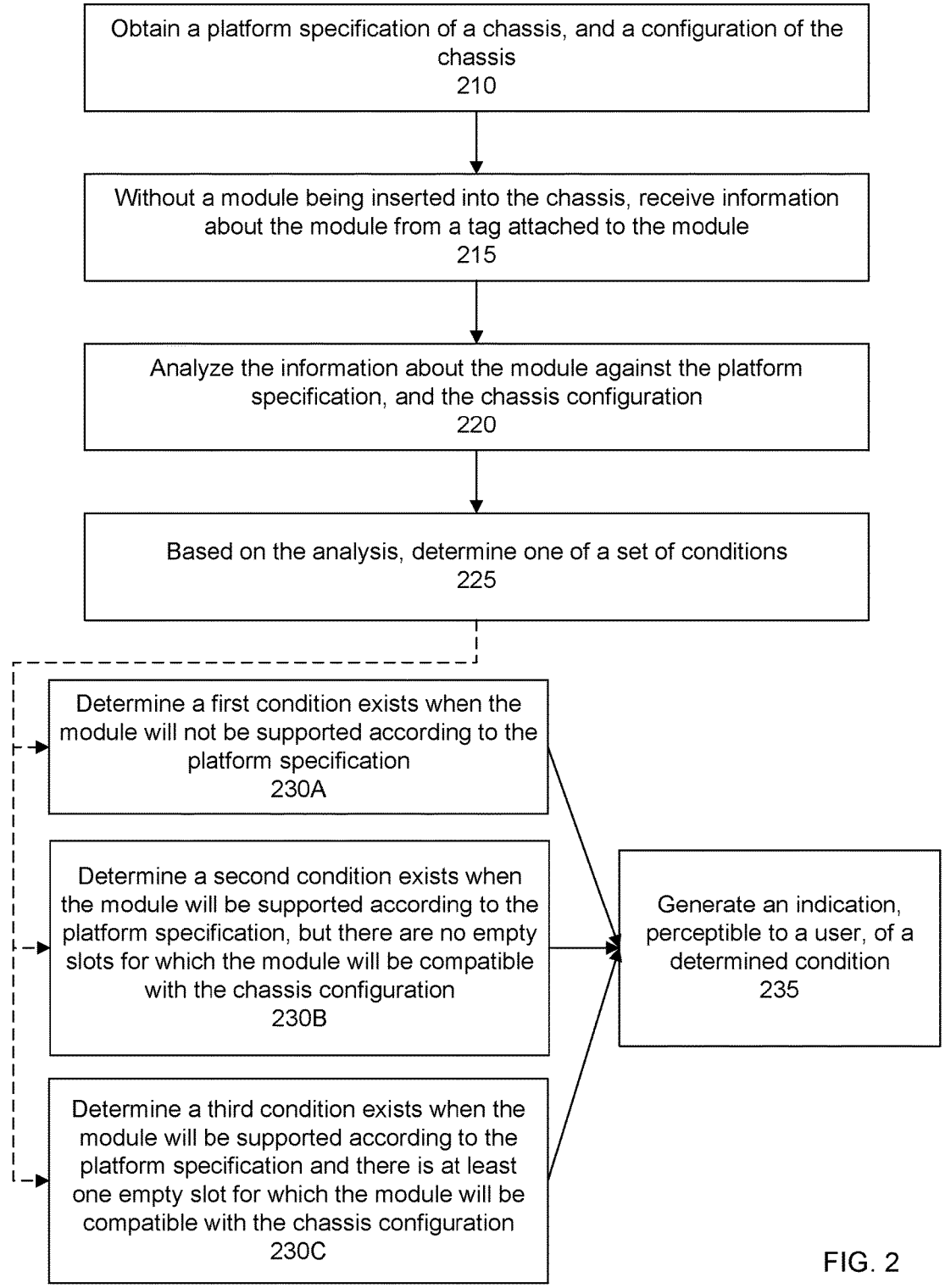
FIG. 2 shows a flow diagram for the module validation system according to a specific embodiment.

FIG. 2 shows an overall flow of the module validation system according to a specific embodiment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, the system obtains a platform specification of a chassis and a configuration of the chassis. The information may be obtained by, for example, issuing commands or queries to an application programming interface (API) exposed by the chassis handling subsystem.

In a step 215, without a module being inserted into the chassis, information about the module is received from a proximity or other contactless tag (e.g., NFC tag) attached to the module. In other words, the module to be checked or tested is external to or outside the chassis. The module may be near the chassis, but may not be touching the chassis or plugged into the chassis.

In a step 220, the received information about the module is analyzed against the platform specification of the chassis and chassis configuration information.

In a step 225, based on the analysis, one of a set of conditions is determined. In a specific embodiment, one of three conditions may exist. In this specific embodiment, the system determines that a first condition exists when the module will not be supported according to the platform specification of the chassis (step 230A). For example, the first condition may exist or occur when the module has not been certified for use in the chassis by the chassis vendor. In a specific embodiment, a platform specification of a chassis includes a listing of modules that are supported. Information about a prospective module that a user intends to insert into an empty slot of the chassis is received. The listing of modules is scanned to determine whether the prospective module is listed in the listing of supported modules. If the prospective module is not in the listing, a determination is made that the prospective module is not supported. If the prospective module is listed in the listing of supported modules, a determination is made that the prospective module is supported.

Alternatively, the system determines that a second condition exists when the module will be supported according to the platform specification of the chassis, but there are no empty slots for which the module will be compatible with the chassis configuration (step 230B). For example, the module may not be compatible with at least one of the current hardware configuration, current software configuration, or pre-provisioned configuration. More specifically, the second condition may exist or occur, for example, when the module has been certified for use in the chassis by the chassis vendor, but there is another module currently present in the chassis that is not compatible with that module. As another example, the second condition may exist or occur when the module has been certified for use in the chassis by the chassis vendor, but there is a conflict with the current software configuration of the chassis. As another example, the second condition may exist or occur when the module has been certified for use in the chassis by the chassis vendor, but the organization has preconfigured the chassis to restrict the module from being used or restricted the module from being used in combination with one or more other modules that may already be present in the chassis.

Alternatively, the system determines that a third condition exists when the module will be supported according to the platform specification and there is at least one empty slot for which the module will be compatible with the chassis configuration (step 230C). That is, the module will be compatible with each of the current hardware and software configurations and pre-provisioned configuration settings or requirements.

For example, the third condition may exist or occur when the module has been certified for use in the chassis by the chassis vendor and there is an empty slot such that should the module be inserted into the empty slot, the module will be compatible with other modules currently or already present and will also be compatible with the current software configuration of the chassis.

In a step 235, an indication is generated of a determined condition. The indication may include any type of indication or combination of indications that is perceptible to a user. Such indications may include visual indications (e.g., activating light emitting elements, flashing patterns, displaying particular colors, displaying text, messages, icons, symbols, and the like on an electronic screen), audio indications such as sounds, beeps, voice, speech, or combinations of these.

In a specific embodiment, a visual indication corresponding to the determined condition is generated and provided to the user. The visual indication allows the user to see, for example, 1) whether the module is or is not supported according to the platform specification; 2) if the module is supported according to the platform specification, whether the module is also compatible with the configuration of the chassis; and 3) if the module is supported according to the platform specification and also compatible with the chassis configurations—which particular empty slots are compatible or valid.

For example, referring back now to FIG. 1, in some cases the module may be compatible with empty slots 124C and 124E. In other cases, the module may be compatible with only a subset of the empty slots (e.g., compatible with empty slot 124C and not compatible with empty slot 124E).

The indication (e.g., visual indication) that is generated depends upon the type of condition that has been determined. In a specific embodiment, when the first condition exists (module not supported according to the platform specification), a light emitting element on the indicator display of the module validation system will be activated. The light emitting element may be activated with a particular color (e.g., red) to indicate that the module is not supported according to the platform specification.

When the second condition exists (module supported according to the platform specification, but no empty slots for which the module will be compatible with the chassis configuration), the light emitting element may be activated with another different color (e.g., yellow) to indicate that although the module is supported according to the platform specification, there are no empty slots for which the module will be compatible with the chassis configuration. In another specific embodiment, the module validator outputs to an electronic display detailed information regarding the compatibility, incompatibility, or both. For example, the output may identify the currently installed module that is incompatible with the prospective module, identify the particular software configuration setting that is incompatible with the prospective module, and so forth.

When the third condition exists (module supported according to the platform specification, and there is at least one empty slot for which the module will be compatible with the chassis configuration), the light emitting element may be activated with another different color (e.g., green) to indicate that the module is supported according to the platform specification and that there is at least one empty slot for which the module will be compatible with the chassis configurations. In a specific embodiment, the existence of the third condition further triggers activation of chassis beacon lights associated with each of the empty slots for which the module is supported and compatible. This allows the user to visually see which particular empty slots can accept the module. For example, if slots 2, 3, and 5 are empty, but the module is compatible only in slots 2 and 3, then beacon lights for slots 2 and 3 will be activated while the beacon light for slot 5 remains not activated.

Referring back now to FIG. 1 as another example, if the module is supported according to the platform specification and at least one of empty slots 124C or 124E are compatible in regards to chassis configuration then the third condition exists. In other words, if the presence of the module in any of the empty slots (slots 124C and 124E) will be compatible with the chassis configurations, then beacon lights for each of the empty slots will be activated (e.g., beacon lights 127C and 127E activated). If the presence of the module is compatible in empty slot 124C, but not compatible in empty slot 124E, then beacon light 127C will be activated and beacon light 127E will not be activated. Alternatively, the lighting scheme may be swapped; in other words, beacon lights may be activated for invalid slots while beacon lights are not activated for valid slots.

Chassis slot beacon lights are typically of a single color. Thus, it can be difficult to express clearly the compatibility condition of a particular empty or unoccupied slot. In a specific embodiment, the indicator display is capable of displaying two or more different colors. The indicator display may be referred to as a status LED. A first color (e.g., red) indicates the first condition. A second color (e.g., yellow) indicates the second condition. A third color (e.g., green) indicates the third condition.

In this specific embodiment, when the first condition exists, no beacon lights are activated. Similarly, when the second condition exists, no beacon lights are activated. When the third condition exists, beacon lights corresponding to the empty slots of the chassis that are compatible with the module are activated or lit. For example, in some cases, the module may be compatible in only a subset of the empty slots. Beacon lights associated with this subset of slots may then be lit to indicate their compatibility.

In a specific embodiment, a hardware system architecture is provided that uses Near Field Communication (NFC) technology to test or determine support and compatibility between a module and chassis without having to insert the module into the chassis. In this specific embodiment, the architecture uses two NFC devices: NFC tags and NFC reader. NFC tags are installed on the pluggable modules and an NFC tag reader is incorporated in the system. A method includes generation of a compatibility matrix and an evaluation of compatibility for a given query. Prior to module insertion, the user simply brings the pluggable module near the "testing" area of the switch (e.g., chassis) and is notified by a visual indication (e.g., an LED or a display, depending on the system capability) if the module is, not only supported by the system, but also if it is compatible with the chassis (e.g., current) configuration.

The module validation system is not limited to any computing device in a specific form factor, but can include all types of computing devices in various form factors. One type of form factor may include a standalone, portable tool, or dongle. Another type of form factor may include an integration of the module validation system with the chassis. Another type of form factor may include a central detector station having a module validation system. Another type of form factor may include an integration of the module validation system with the rack. Another type of form factor may include mobile app or mobile application program having a module validation system.

Figure 3:
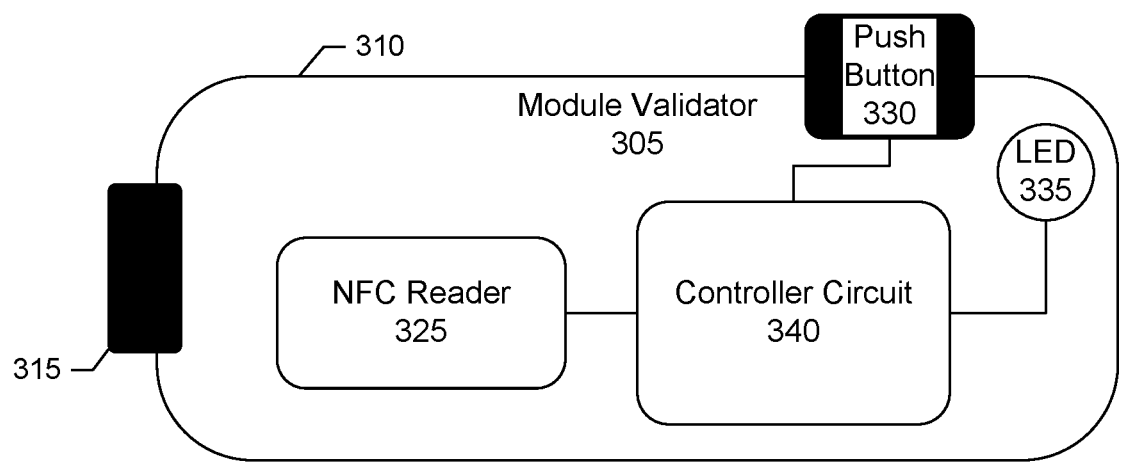
FIG. 3 shows a portable module validator tool according to a specific embodiment.
Figure 4:
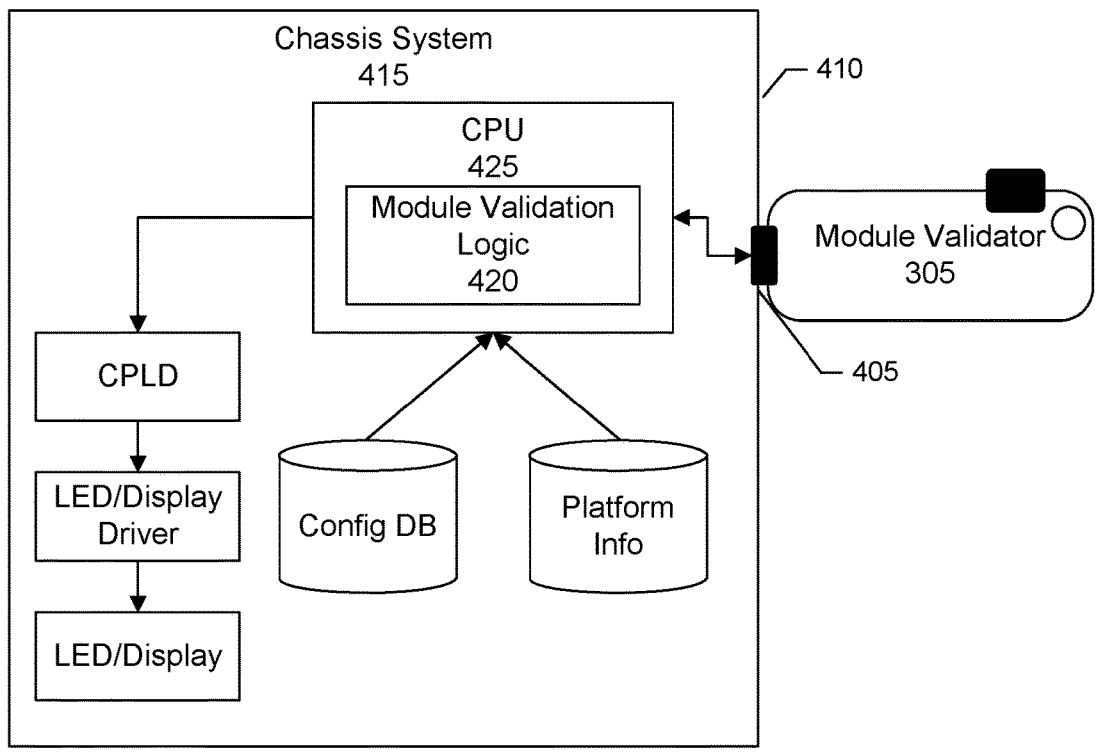
FIG. 4 shows a first state of the portable module validator tool shown in FIG. 3 being plugged into a chassis.
Figure 5:
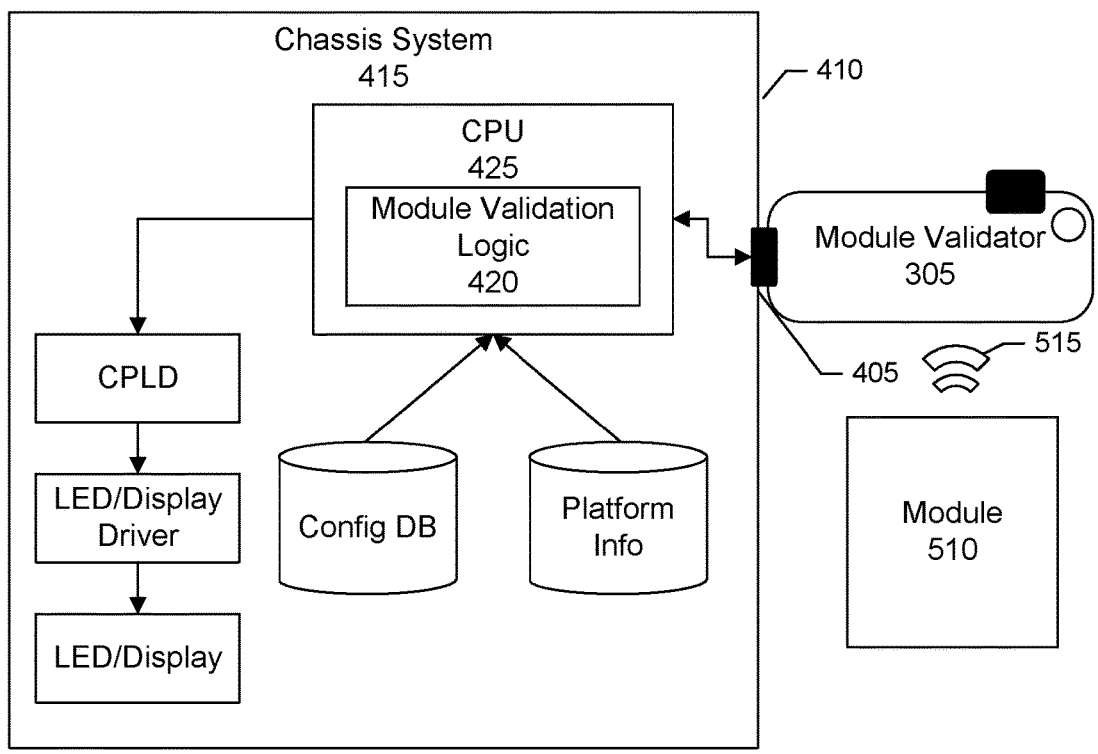
FIG. 5 shows a second state of the portable module validator tool shown in FIG. 3 reading information about a module to check support and compatibility.

For example, FIGS. 3-5 show an example of a standalone module validation system. Specifically, FIG. 3 shows a block diagram of a portable module validator tool or dongle 305. FIG. 4 shows a block diagram of the validator tool having been inserted into a chassis. FIG. 5 shows a block diagram of a module being checked for support and compatibility via the validator tool. Referring now to FIG. 3, in this specific embodiment, the module validator tool includes a case 310 housing a connector 315, tag reader 325, push button 330, checker light emitting element (e.g., multi-color status LED) 335, and controller circuit 340 connected to the components.

In a specific embodiment, the connector includes a USB connector. The connector extends out from the case and allows the module validator tool to be plugged into a corresponding receptacle (e.g., USB receptacle) of the chassis (or other device having the corresponding receptacle). In a specific embodiment, the tag reader includes an NFC tag reader. The push button can be pushed by the user to activate the module validation tool. The light emitting element can be a multi-color LED capable of displaying different colors.

For example, the light emitting element may display a first color (e.g., red) to indicate the first condition, i.e., that the module is not supported according to the platform specification of the chassis; a second color (e.g., yellow) to indicate the second condition, i.e., that the module is supported according to the platform specification, but there are no empty slots for which the module will be compatible with the chassis configurations; or a third color (e.g., green) to indicate the third condition, i.e., that the module is supported according to the platform specification and there is at least one empty slot for which the module will be compatible with the chassis configurations.

Figure 21:
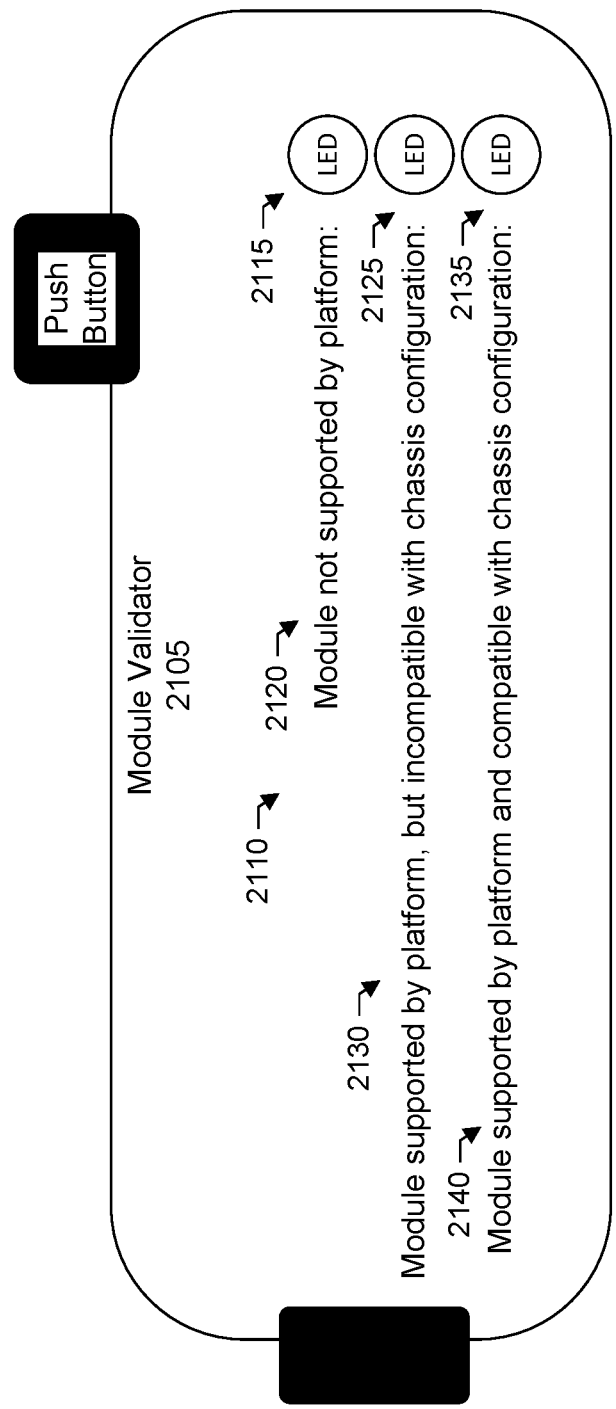
FIG. 21 shows a user interface of a module checker according to another specific embodiment.

It should be appreciated that any type of visual indication or combination of visual indications may be used to indicate to the user the results of the support and compatibility check. For example, the module validator tool may include separate individual single color LEDs corresponding to the possible conditions. More particularly, FIG. 21 shows a module checker, validator tool, or dongle 2105 that includes a set of labels 2110 printed on a surface of the tool. A first lighting element 2115 is associated with a first label 2120, a second lighting element 2125 is associated with a second label 2130, and a third lighting element 2135 is associated with a third label 2140. The first label may correspond to the first condition. The second label may correspond to the second condition. The third label may correspond to the third condition. Depending upon the outcome of the module compatibility check, the first lighting element may be activated to indicate the first condition. The second lighting element may be activated to indicate the second condition. The third lighting element may be activated to indicate the third condition.

As another example, there can be a single light emitting element that emits a single color and the results of the module check may be provided to the user via different flashing or blinking patterns. As another example, instead of or in addition to a visual indication, there may be an audio indication (e.g., beeping sounds).

Referring back now to FIG. 3, the controller circuit is responsible for directing the overall operation of the module validator tool. This may include, for example, activating the tag reader when a user pushes the push button, handling communication between the tool and the chassis into which the tool has been inserted, and activing the status LED to indicate the determined support and compatibility condition.

In this specific embodiment, the module validator tool is designed as a portable device that can be carried by the user. For example, when the user wishes to check the support and compatibility of a module for a chassis, the user can insert the module validator tool into the chassis, press the push-button, and bring the module within range of the tag reader. The tag reader acquires the information about the module from the corresponding tag attached to the module. The module validation or compatibility algorithm is executed and the results are indicated via the light emitting element (e.g., status LED) on the module validation tool.

More particularly, FIG. 4 shows a block diagram of the module validator tool having been inserted into a receptacle (e.g., USB) 405 of a chassis 410. FIG. 5 shows a block diagram of a module 510 being brought into a range of the tag reader in the tool. In this specific embodiment, a system 415 of the chassis is provided with module validation logic 420 that may be executed by a central processing unit (CPU) 425 of the chassis system.

In this specific embodiment, the module validation tool includes a push-button to initiate the support and compatibility detection logic. The module validation tool may be referred to as a detector module or module checker. Until the push-button is pressed, detection is not started. On the pluggable module, built-in commands of the NFC protocol are used to eliminate RF signal interference and overlap.

In this specific embodiment, NFC tags in all pluggable modules are in HALT (disable) state by default. In this state, the tags do not participate in the RF field. When a pluggable module is brought near the detector (module validation tool) and the push-button on the station is pressed, it generates a WUPA (wake-up) or a REQA (request) command that wakes up the NFC tag in the RF field. Once the task of compatibility detection is accomplished, the NFC tag is put back into HALT (disable) state thus eliminating any kind of RF signal interference. The module validation logic can use the obtained current configuration of the chassis to distinguish between modules that are already present in the chassis and the module that is being checked.

Further, in an embodiment, the NFC reader of the validation tool may be located at an end of the tool that is opposite an end having the USB connector. This location of the NFC reader helps to position the reader away from the chassis when the tool is inserted into the chassis. The positioning helps to ensure against signal interference from other modules already presently installed in the chassis. That is, when the validation tool is inserted into a chassis, the distance between the NFC reader of the tool and existing modules in the chassis may be greater than the range of the NFC reader.

Factors affected the reading range including antenna size, radius of the antenna coil, shape of the antenna coil, or other factors, or combinations of these. As one of skill in the art will recognize, these design parameters can be adjusted to provide a very short reading range as desired. For example, the reading range may be designed so that the reader and tag must almost be touching each other in order for the tag to be activated and read. Thus, if there are multiple modules in a system that have NFC tags, these existing modules will be kept independent and non-interfering with the new module that the user wishes to test because the distance between the existing modules and tag reader will be greater than the designed reading range. In order to test the new module, the user can then deliberately bring the new module near or very close to the tag reader. In other words, a short reading range helps to facilitate reading or recognizing a tag only when there is a direct and intended action by the user.

Figure 6:
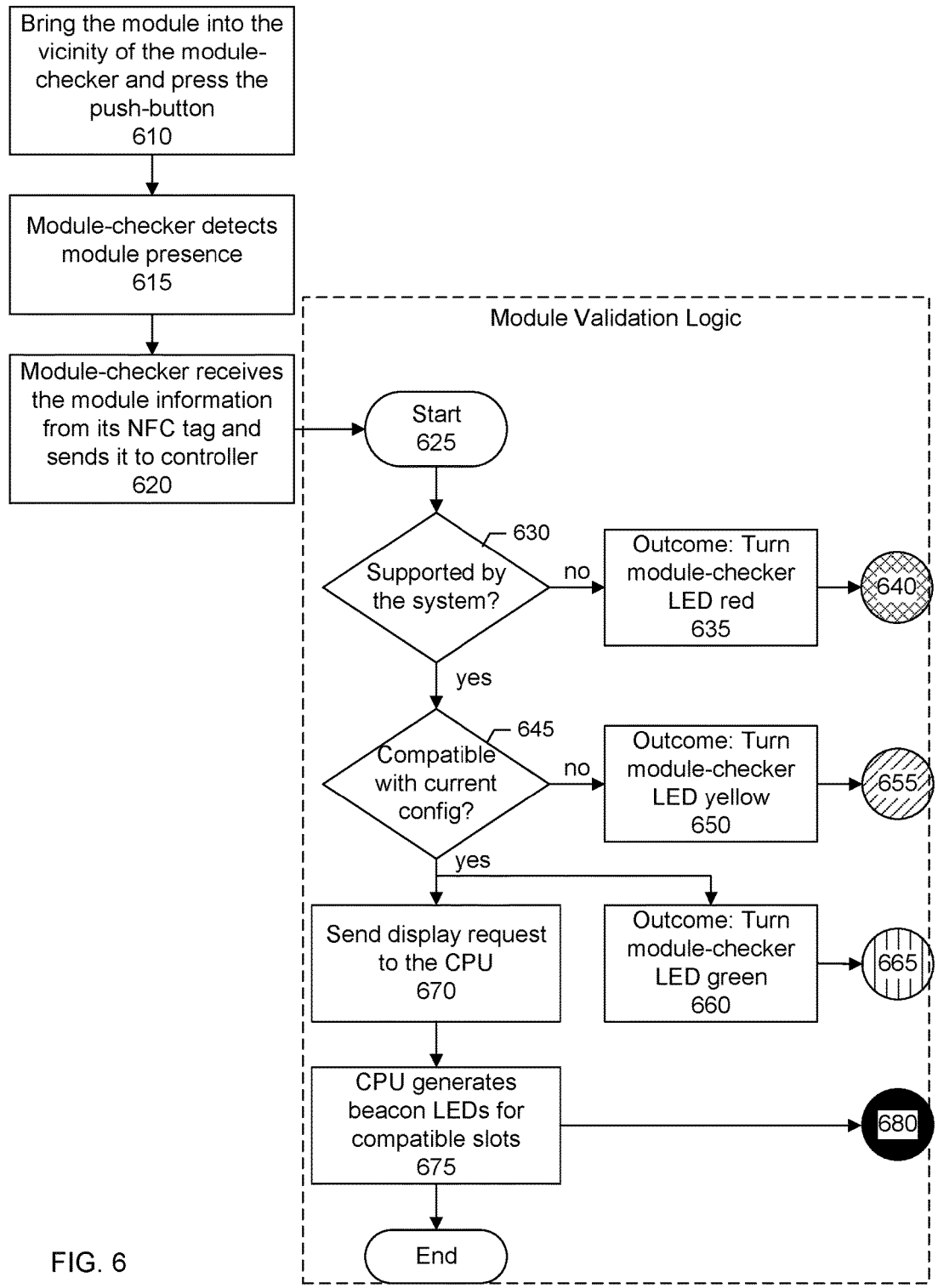
FIG. 6 shows a flow diagram for the module validation logic according to a specific embodiment.

FIG. 6 shows a flow of the module validation logic according to a specific embodiment. In a step 610, the user brings a module to check or test into the vicinity of the module checker and presses the push-button. In a step 615, the module-checker detects a presence of the module. In a step 620, the module-checker receives the module information from the tag (e.g., NFC tag) attached to the module and sends the information to the controller (e.g., chassis handling subsystem controller).

In a step 625, the controller starts executing the module validation logic. The module validation logic includes a set of decision points in determining the support and compatibility of the module and thus what color should be displayed on the module checker.

Specifically, in a step 630, the received module information is checked to determine whether the module is supported by the chassis system (e.g., supported by the platform specification or static configuration). In a step 635, if the outcome of the check is that the module is not supported by the chassis system, a signal is generated to turn the module checker lighting element a first color (e.g., red) 640.

In a specific embodiment, the module is declared "unsupported" by the system in event of any one of the following conditions being met: 1) module not supported by the platform; or 2) hardware revision not supported by installed software operating system (OS).

Alternatively, in a step 645, if the module is supported by the chassis system, a check is performed to determine whether the module is compatible with the current or chassis configuration. In a step 650, if the outcome of the check is that the module is not compatible with the chassis configuration, a signal is generated to turn the module checker lighting element a second color (e.g., yellow or orange) 655.

In a specific embodiment, the module is declared "incompatible" by the system due to any of the following reasons: 1) Even though the module is supported by the platform/slot, the current hardware or software configuration of the system does not support the module. For example, a reverse airflow fan tray will be rendered in this state when inserted into forward airflow system. Or, 2) Features provided by the module are not supported by the software OS.

Alternatively, in a step 660, if the outcome is that the module is compatible with the chassis configuration (and is supported according to the platform information), a signal is generated to turn the module checker lighting element a third color (e.g., green) 665. Additionally, in a step 670, a beacon display request is sent to the chassis handling subsystem CPU. The request includes a command to activate beacon LEDs associated with the empty slots for which the module will be compatible. In a step 675, the CPU generates or activates the beacon LEDs for the compatible slots, thereby indicating to the user which empty slots can accept the module. For example, the beacon LEDs associated with the compatible slots may be lit in a blue color 680.

In a specific embodiment, the module is declared compatible when the module is supported by the platform, and is compatible with current configuration and feature set supported by the software OS.

As shown in the example of FIG. 6, in a specific embodiment, an initial or threshold check is whether or not the module is supported by the system (e.g., supported according to the platform specification of the chassis). In this specific embodiment, if the module does not pass this initial or threshold check, the validation process can be terminated.

Figure 7:
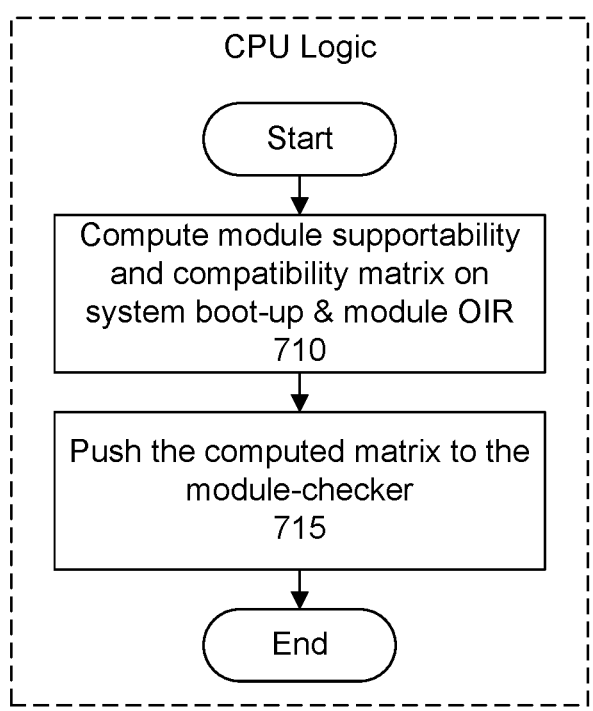
FIG. 7 shows a flow of a system boot-up sequence of a chassis according to a specific embodiment.

FIG. 7 shows detail of a flow of the CPU logic for computing a compatibility matrix. In a specific embodiment, there is a system boot-up sequence during which the CPU pre-computes the compatibility matrix based on the static hardware model, currently inserted cards and dynamic provisioning information. It then pushes the matrix to the module checker where the matrix is used for compatibility detection. As shown in the example of FIG. 7, in a step 710, the logic computes a module supportability and compatibility matrix on the system during boot-up, module online insertion and removal (OIR) event, or both. In a step 715, the computed matrix is pushed to the module-checker.

In a specific embodiment, the supportability and compatibility matrix is pre-computed as part of the boot-up sequence. That is, the matrix may be computed before there is a request to check to the support and compatibility of a module. The matrix may be recomputed or updated after a module has been inserted and before there is another request to check the support and compatibility of another module.

The precomputed matrix can be cached and thus quickly pushed to the module-checker should the need arise. Precomputing the matrix can help to ensure fast performance of the module checking operation because the matrix will have already been computed when a request for a compatibility check is received.

In another specific embodiment, the matrix may be computed on-demand such as after there is a request to check the compatibility of a module. Computing the matrix upon receipt of a request to check the compatibility of a module can help to lower the initial boot-up time of the chassis.

Tables A-C below show some sample tables for calculating a compatibility matrix for a particular slot in a given system.

TABLE A

| Module Type | Identifier |
|---|---|
| Module A | 01 |
| Module B | 10 |
| Module C | 11 |

Table A includes a first column showing a listing of module types and a second column showing listing of corresponding identifiers.

TABLE B

| Condition | Supported? | Compatible? |
|---|---|---|
| Module not supported | False | Not applicable |
| Module supported but not compatible in current configuration | True | False |
| Module supported and compatible in current configuration | True | True |

Table B may be referred to as a matrix truth table. A first column lists potential conditions. A second column stores a flag indicating whether the module is supported based on the corresponding condition (e.g., supported by the static configuration or platform of the chassis). A third column stores a flag indicating whether the module is compatible based on the corresponding condition.

TABLE C

| Boolean Value | Interpretation |
|---|---|
| 00 | Module not supported |
| 01 | Module not supported |
| 10 | Module supported but not compatible in current configuration |
| 11 | Module supported and compatible in current configuration |

Table C shows an interpretation of Boolean values.

Consider, as an example, that chassis-X is a 4-slot box that supports only module-A and module-B, but not module-C; and it has the following conditions: 1) Only one module-A can be present in the system at any time; and 2) module-B can be placed into any slot except slot-1.

Table D below represents an initial state of chassis-X in which slots 1-4 are empty as indicated by the blank row below the slot numbers.

TABLE D

| Slot-1 | Slot-2 | Slot-3 | Slot-4 |
|---|---|---|---|

In a first step of a specific embodiment, when chassis-X boots up without any module (e.g., card), the chassis CPU computes the matrix shown in table E below

TABLE E

| Module types considered | Validation results |
|---|---|
| Module A | Supported: Module-A is supported by the system and will not cause any incompatibility in current hardware and software configuration |
| Module B | Supported: Module-B is supported by the system and will not cause any incompatibility in current hardware and software configuration |
| Module C | Not supported: Module-C is not supported by the system. |

The chassis CPU then sends or pushes the matrix to the module-checker. In other words, in this specific embodiment, this compatibility matrix is transferred to the module checker in the form of the following table. When the module checker detects a card type, it takes into consideration compatibility matrixes for all slots and generates the appropriate response as shown in the example of table F below.

TABLE F

| Module detected | Validity matrix | Result |
|---|---|---|
| 01 | 11 | Activate lighting element according to third condition (e.g., green LED). |
| 10 | 11 | Activate lighting element according to third condition (e.g., green LED) |
| 11 | 01 | Activate lighting element according to first condition (e.g., red LED). |

When module-A, module-B or module-C is brought into the vicinity of the module-checker, the locator (beacon) LED will be lit in slots as show in table G below.

TABLE G

| Module type | Locator LED slots lit |
|---|---|
| Module A | 1, 2, 3, 4 |
| Module B | 2, 3, 4 |
| Module C | No LED is lit |

As shown in the example of table G above, locator or beacon LEDs corresponding to chassis slots 1, 2, 3, and 4 will be activated when a module of type A (identifier 01) is checked for compatibility. The other lighting element on the module checker (e.g., status LED) will also be activated to indicate compatibility (e.g., green LED activated, see, e.g., table F above). The lighting of the beacon LEDs associated with the compatible slots thus indicate to the user that module A may be inserted into slots 1, 2, 3, and 4.

Locator (beacon) LEDs corresponding to chassis slots 2, 3, and 4 will be activated when a module of type B (identifier 10) is checked for compatibility. The other lighting element on the module checker will also be activated to indicate compatibility (e.g., green LED activated, see, e.g., table F above). The lighting of the beacon LEDs associated with the compatible slots thus indicate to the user that module B may be inserted into slots 2, 3, and 4. The beacon LED corresponding to slot 1 will not be activated thus indicating to the user that module B is not compatible in slot 1.

Locator (beacon) LEDs corresponding to chassis slots 1-4 will not be activated when a module of type C (identifier 11) is checked for compatibility. The reason is because in this example, a type C module is not supported by the chassis system. The other lighting element on the module checker will, however, be activated to indicate the lack of support or compatibility (e.g., red LED activated, see, e.g., table F above).

To continue with the example above, consider that in a second step module-A is inserted into slot-2 in chassis-X as shown in table H below.

TABLE H

| Slot-1 | Slot-2 | Slot-3 | Slot-4 |
|---|---|---|---|
| | Module-A | | |

The chassis CPU will re-compute the matrix and send it to the module-checker. The module types considered and corresponding validation results are again shown in table I below.

TABLE I

| Module types considered | Validation results |
|---|---|
| Module A | Supported: Module-A is supported by the system but it is incompatible in current hardware and software configuration. |
| Module B | Supported: Module-B is supported by the system and will not cause any incompatibility in current hardware and software configuration. |
| Module C | Not supported: Module-C is not supported by the system. |

Table J below shows an example of the re-computed compatibility matrix based on module A having been inserted into slot-2.

TABLE J

| Module detected | Validity matrix | Result |
|---|---|---|
| 01 | 10 | Activate lighting element according to second condition (e.g., yellow LED) |
| 10 | 11 | Activate lighting element according to third condition (e.g., green LED) |
| 11 | 01 | Activate lighting element according to first conditoin (e.g., red LED). |

The compatibility matrix shown in table J is similar to the compatibility matrix shown in table F. In table J, however, a detection of module type A (identifier 01) will cause the activation of the yellow LED on the module checker because for this example a type A module has already been inserted into the chassis; and a condition of the chassis is that only one type A module can be present in the system at any time. In other words, the activation of the yellow LED on the module checker indicates to the user that the chassis system (e.g., chassis platform specification or static configuration) supports a type A module, but such a module is not supported in the current configuration of the chassis.

Table K below shows the lighting of the locator (beacon LEDs) of the corresponding slots when module-A, module-B or module-C is brought into the vicinity of the module-checker.

TABLE K

| Module type | Locator LED slots lit |
|---|---|
| Module A | No LED is lit |
| Module B | 3, 4 |
| Module C | No LED is lit |

Table K, in contrast to table G above, shows that locator (beacon) LEDs will not be activated when a module of type A (identifier 01) is checked for compatibility because the chassis supports only one type A module present in the system at any time. The other lighting element on the module checker will be activated to indicate the compatibility condition (e.g., yellow LED activated, see, e.g., table J).

Locator (beacon) LEDs corresponding to slots 3 and 4 will be activated when a module of type B (identifier 10) is checked for compatibility. The other lighting element on the module checker will be activated to indicate the compatibility condition (e.g., green LED activated, see, e.g., table J). Locator LEDs corresponding to slots 1 and 2 will not be activated. In particular, a locator LED corresponding to slot 1 will not be activated because a condition of the chassis platform is that a type B module is not permitted in slot 1. A locator LED corresponding to slot 2 will not be activated because although the chassis platform supports a type B module in slot 2, slot 2 is presently holding another module (type A module).

Locator (beacon) LEDs corresponding to slots 1-4 will again not be activated when a module of type C is checked for compatibility. The other lighting element on the module checker will, however, be activated to indicate the lack of support or compatibility (e.g., red LED activated, see, e.g., table J above).

To continue with the example above, consider that in a third step modules of type B are inserted into slot-3 and slot-4 of chassis-X as shown in table L below.

TABLE L

| Slot-1 | Slot-2 | Slot-3 | Slot-4 |
|---|---|---|---|
| | Module-A | Module-B | Module-B |

After module-B is inserted into slot-3 and slot-4 in chassis-X, the chassis CPU will re-compute the matrix (see, e.g., tables M and N below) and sends it to the module-checker.

TABLE M

| Module types considered | Validation results |
|---|---|
| Module A | Supported: Module-A is supported by the system but it is incompatible in current hardware and software configuration. |
| Module B | Supported: Module-B is supported by the system but it is incompatible in current hardware and software configuration. |
| Module C | Not supported: Module-C is not supported by the system. |

TABLE N

| Module detected | Validity matrix | Result |
| --- | --- | --- |
| 01 | 10 | Activate lighting element according to second condition (e.g., yellow LED) |
| 10 | 10 | Activate lighting element according to second condition (e.g., yellow LED) |
| 11 | 01 | Activate lighting element according to first condition (e.g., red LED). |

The compatibility matrix shown in table N is similar to the compatibility matrix shown in table J. In table N, however, a detection of module type B (identifier 10) will cause activation of the yellow LED on the module checker because for this example the only unoccupied or empty slot is slot-1 and a type B module is not permitted in slot-1. In other words, the activate of the yellow LED on the module checker indicates to the user that the chassis system (e.g., chassis platform or static configuration) supports a type B module, but such a module is not supported in the current configuration of the chassis.

Table O below shows the lighting of the locator (beacon LEDs) of the corresponding slots when module-A, module-B or module-C is brought into the vicinity of the module-checker.

TABLE O

| Module type | Locator LED slots lit |
| --- | --- |
| Module A | No LED is lit |
| Module B | No LED is lit |
| Module C | No LED is lit |

Table O, in contrast to table G above, shows that locator (beacon) LEDs will not be activated when a module of type A (identifier 01) is checked for compatibility because the chassis supports only one type A module present in the system at any time (see, e.g., table L indicating a type A module present in the chassis). The other lighting element on the module checker will be activated to indicate the compatibility condition (e.g., yellow LED activated, see, e.g., table N).

Locator (beacon) LEDs will not be activated when a module of type B (identifier 10) is checked for compatibility because, as discussed above, the only unoccupied slot is slot-1 and the chassis system does not support a type B module in slot-1. The other lighting element on the module checker will be activated to indicate the compatibility condition (e.g., yellow LED activated, see, e.g., table N).

Locator (beacon) LEDs corresponding to slots 1-4 will again not be activated when a module of type C is checked for compatibility. The other lighting element on the module checker will, however, be activated to indicate the lack of support or compatibility (e.g., red LED activated, see, e.g., table N above).

As one of skill in the art will recognize, the module validation logic can be executed by the chassis system itself, by a processor of the module validator tool, or both. For example, some checks or processing may be performed at the chassis. Other checks or processing may be performed at the module validator tool. The module validator tool may obtain the module information from the module tag and pass the module information to the chassis system for analysis. At least a portion of the analysis results may be pushed to the module validator tool so that the tool can display an indication of the determined compatibility condition.

In another specific embodiment, the module validation logic may be executed by the module validator tool. In this specific embodiment, the module validator tool may include a configuration collection unit that collects from the chassis system (e.g., via an API exposed by the chassis system), a platform specification of the chassis, and current configuration. The module validator tool analyzes the module information against the platform specification and the current configurations. The module validator tool may then issue commands to the chassis system that identifies which beacon LEDs should be activated.

FIGS. 8-14 show an example of an integrated form factor according to another specific embodiment. In this specific embodiment, a module validation system is built into or integrated with the chassis. In other words, rather than having a standalone tool (e.g., USB dongle or stick) that can be plugged into a corresponding receptacle (e.g., USB-B/C slot), the module detection logic may be incorporated into the chassis/system.

Figure 8:
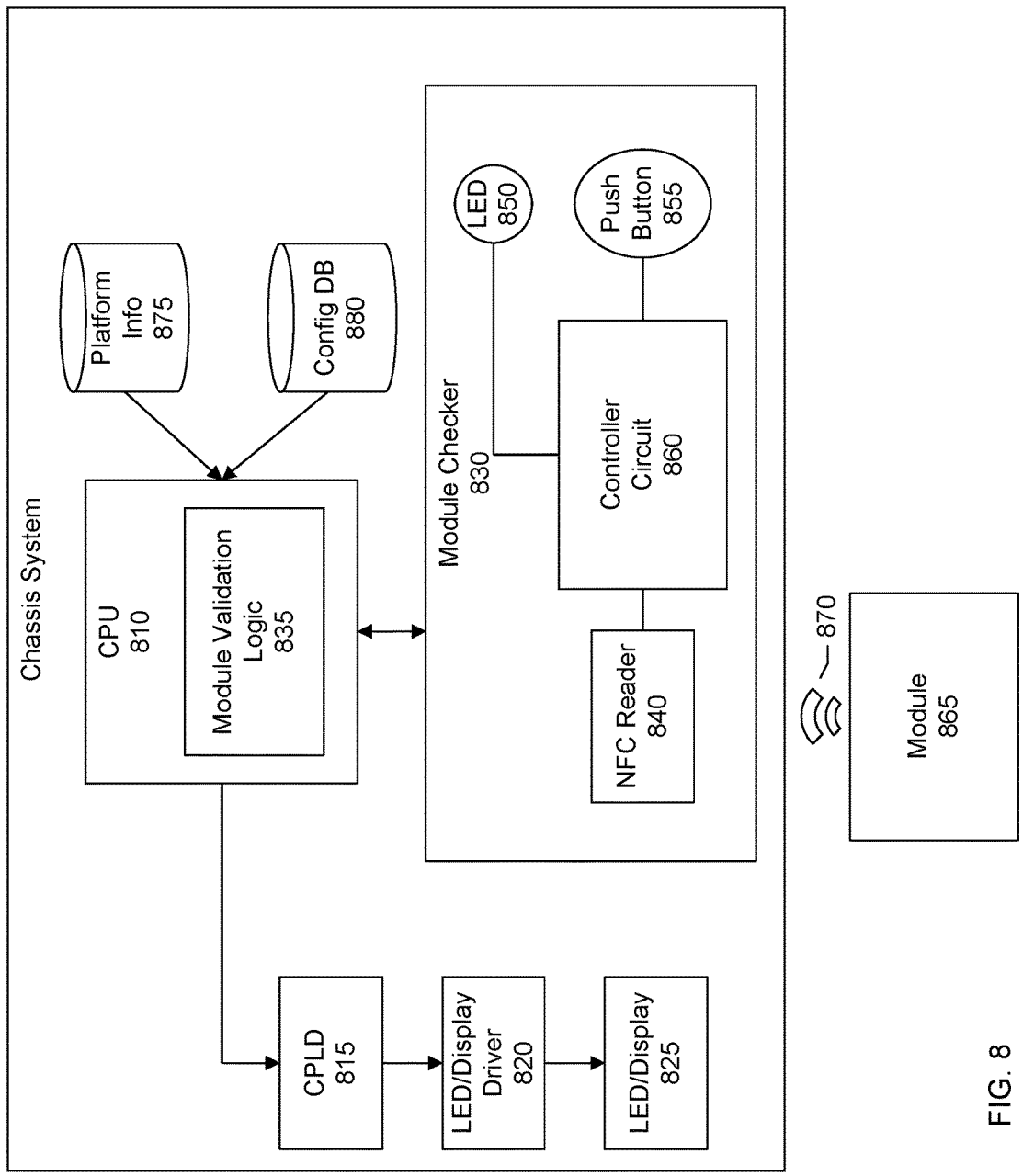
FIG. 8 shows a chassis having an integrated module validation system according to a specific embodiment.
Figure 10:
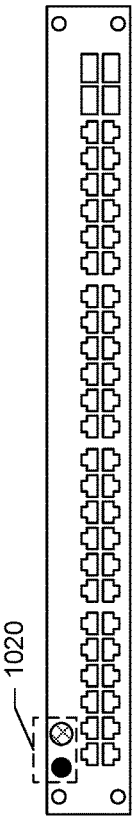
FIG. 10 shows another panel of a chassis having the module checker according to a specific embodiment.
Figure 11:
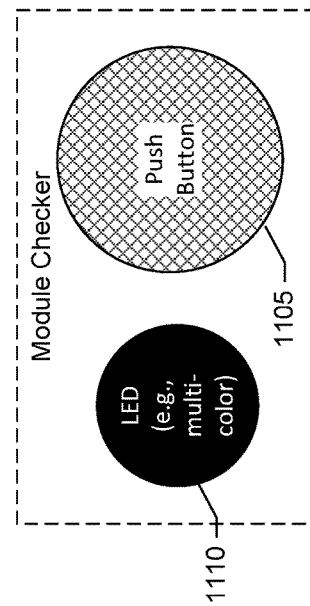
FIG. 11 shows an enlarged view of the module checker according to a specific embodiment.
Figure 9:
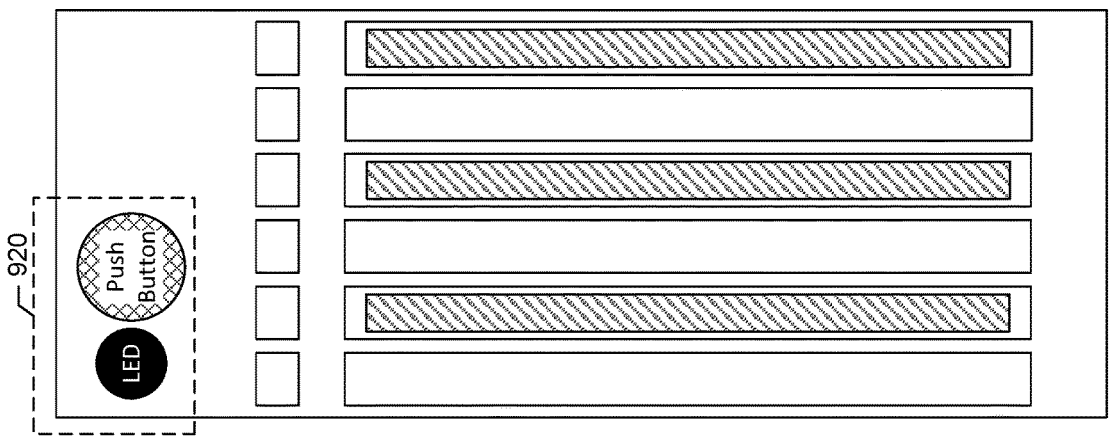
FIG. 9 shows a panel of a chassis having a user interface region with a module checker according to a specific embodiment.
Figure 12:
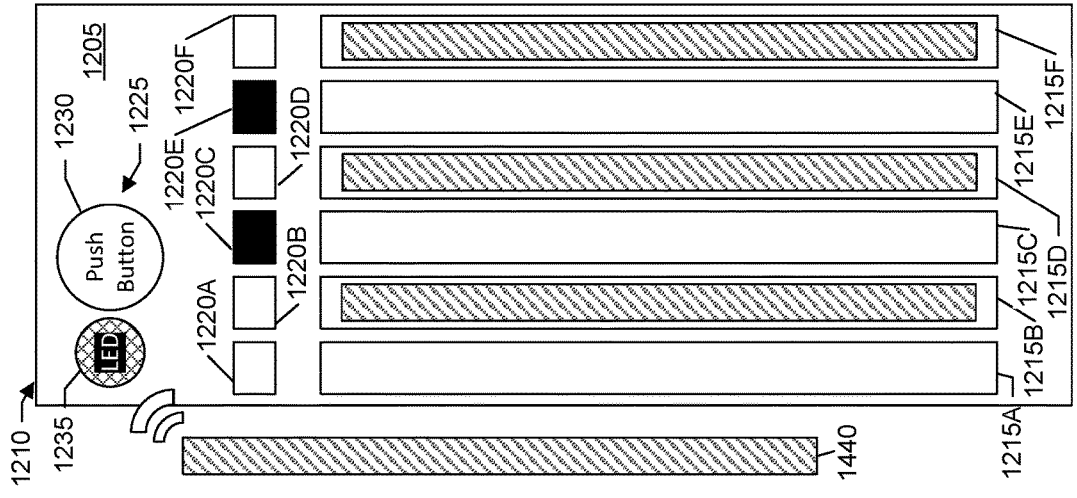
FIG. 12 shows a block diagram of checking a module with a chassis having an integrated module validation system and determining the module to be unsupported according to a specific embodiment.
Figure 13:
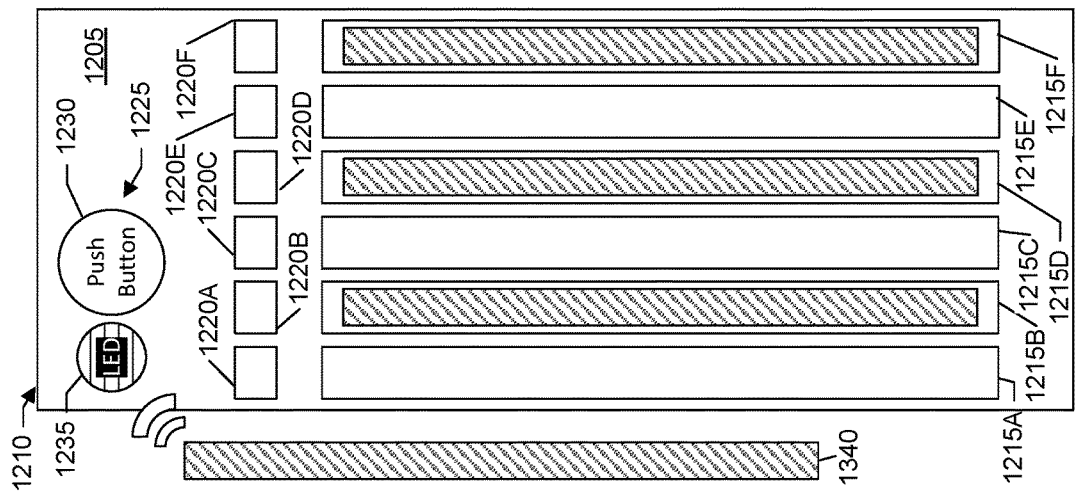
FIG. 13 shows a block diagram of checking another module with a chassis having an integrated module validation system and determining the module to be supported but incompatible with a configuration of the chassis according to a specific embodiment.
Figure 14:
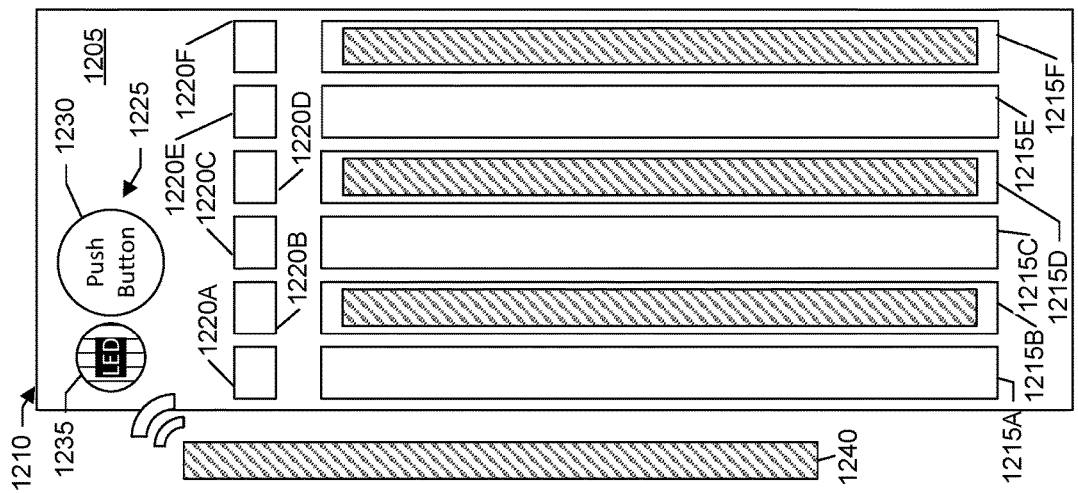
FIG. 14 shows a block diagram of checking another module with a chassis having an integrated module validation system and determining the module to be supported and compatible with a configuration of the chassis according to a specific embodiment.

Specifically, FIG. 8 shows a block diagram of a system architecture where the module detection logic and module checker tool or functions are integrated with the chassis. FIG. 9 shows a view of a panel of a chassis having a built-in module checker. FIG. 10 shows another view of a panel of chassis having a built-in module checker. FIG. 11 shows an enlarged view of a portion of the panel having the built-in module checker. FIG. 12 shows an unsupported module being checked by a built-in module checker of a chassis. FIG. 13 shows a supported but incompatible module being checked by a built-in module checker of a chassis. FIG. 14 shows a supported and compatible module being checked by a built-in module checker of a chassis.

Referring now to FIG. 8, there is shown a system architecture of a chassis. The system architecture includes a CPU 810, CPLD 815, an LED/display driver 820, and an LED/display 825, along with a module checker 830. As shown in the example of FIG. 8, the CPU is connected to the CPLD which is connected to the LED/display driver, which in turn is connected to the LED/display. The CPU includes module validation logic 835 and is connected to the module checker. The module checker includes a tag reader (e.g., NFC tag reader) 840, a checker lighting element 850, and a push button 855, each of which are interconnected by a controller circuit 860.

To use the checker, the user brings a module 865 within range of the tag reader and presses the push button. Tag on the module is activated and information about the module is transmitted 870 to the tag reader. The module validation logic receives the information about the module and analyzes received information about the module against platform information 875 pertaining to the chassis and a configuration 880 of the chassis.

FIG. 9 shows a view of a panel of a chassis in which a portion of the panel includes a module checker 920. In the example shown in FIG. 9, the module checker is located on an I/O panel of the chassis. It should be appreciated, however, that module checker may be located on any panel of the chassis. For example, FIG. 10 shows another view of a panel in which a portion of the panel includes a module checker 1020. In the example shown in FIG. 10, the module checker is located on a utility panel of the chassis. In some embodiments, a chassis may include a module checker located on both the I/O panel and utility panel of the chassis. This helps to ensure that the module checker remains accessible regardless of how the chassis might be oriented.

FIG. 11 shows an enlarged view of the module checker shown in FIGS. 9 and 10. As shown in FIG. 11, the module checker includes a push-button 1105 and a checker lighting element (e.g., multi-color status LED) 1110.

In a specific embodiment, the push button (or similar mechanism) is provided on the chassis system to "initiate" compatibility detection of a module. Once the data is scanned from the hardware module, it is sent to a software module. The software module runs a compatibility algorithm (as discussed above) and generates appropriate control signals via the CPU/CPLD glue circuit to visually indicate status and compatible slots if applicable.

FIG. 12 shows a block diagram of detecting a module that is unsupported. A panel 1205 of a chassis 1210 includes a set of slots 1215A-F, a corresponding set of beacon LEDs 1220A-F, and an integrated module checker 1225. The module checker includes a button 1230 and a checker light emitting element (e.g., status LED) 1235. In the example shown in FIG. 12, slots 1215B, D, and F contain modules as indicate by the fill pattern. Slots 1215A, C, and E are empty or unoccupied. To use the module checker, a user activates the checker by pushing the button and brings a module 1240, having a tag, within range of the tag reader of the module checker. The module checker reads the information stored in the tag and executes the module validation algorithm as discussed above. In this example, the module is determined to be unsupported by the platform. The module checker light is activated to indicate that the module is not supported (as shown by the vertical lines fill pattern) and the beacon LEDs remain deactivated.

FIG. 13 shows a block diagram of detecting a module that is supported, but incompatible with the current configuration. FIG. 13 is similar to FIG. 12. In FIG. 13, however, a module 1340 is supported (e.g., supported by the chassis platform), but is incompatible with a current configuration of the chassis. The module checker light is activated to indicate that the module is supported, but incompatible with the current configuration (as shown by the horizontal lines fill pattern). The beacon LEDs remain deactivated.

FIG. 14 shows a block diagram of detecting a module that is supported and compatible with the current configuration. FIG. 14 is similar to FIG. 12. In FIG. 14, however, a module 1440 is supported (e.g., supported by the chassis platform) and compatible with a current configuration of the chassis. The module checker light is activated to indicate that the modules is supported and compatible with the current configuration (as shown by the cross-hatching fill pattern). Beacon LEDs 1220C and 1220E corresponding to slots 1215C and 1215E, respectively, are activated to indicate to the user that the module may be inserted into these slots. Although slot 1215A is empty, beacon LED 1220A corresponding to slot 1215A remains deactivated to indicate to the user that this particular module should not be inserted into this particular slot because the module is not compatible with this particular empty slot. Beacon LEDs 1220B and 1220D corresponding to slots 1215B and 1215D remain deactivated because these slots presently contain modules.

Figure 15:
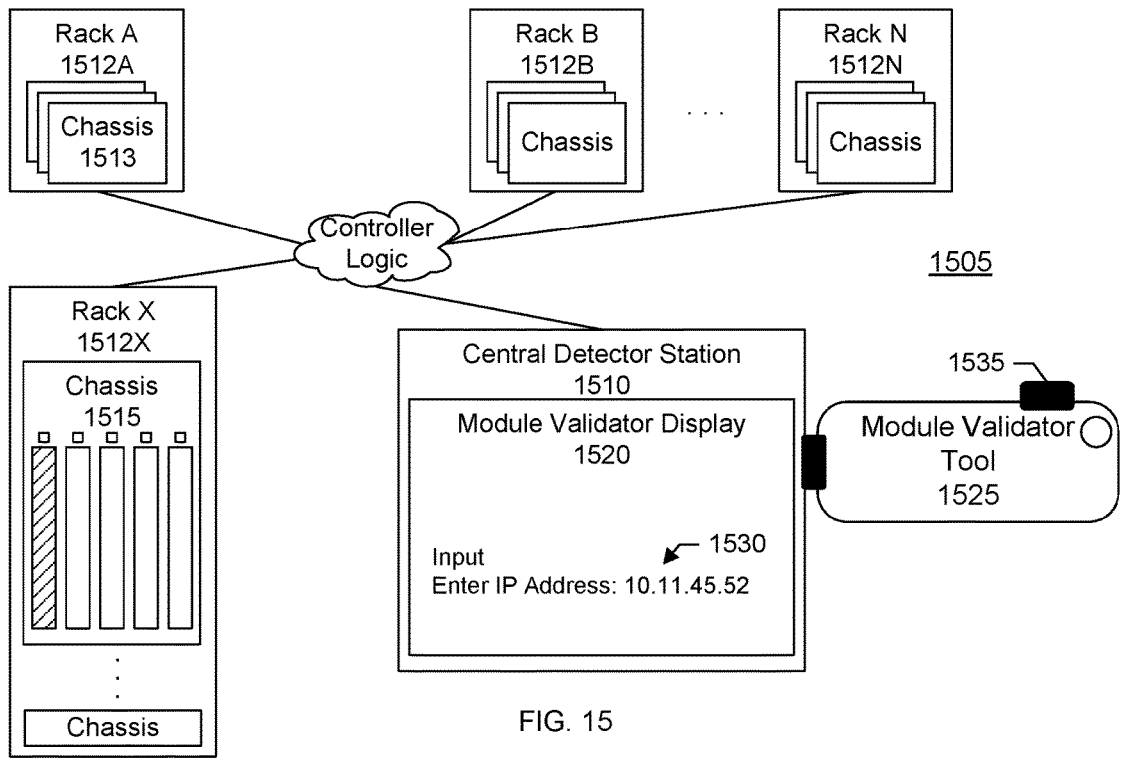
FIG. 15 shows a block diagram of a module validation system being used in a central station of a data center according to a specific embodiment.
Figure 16:
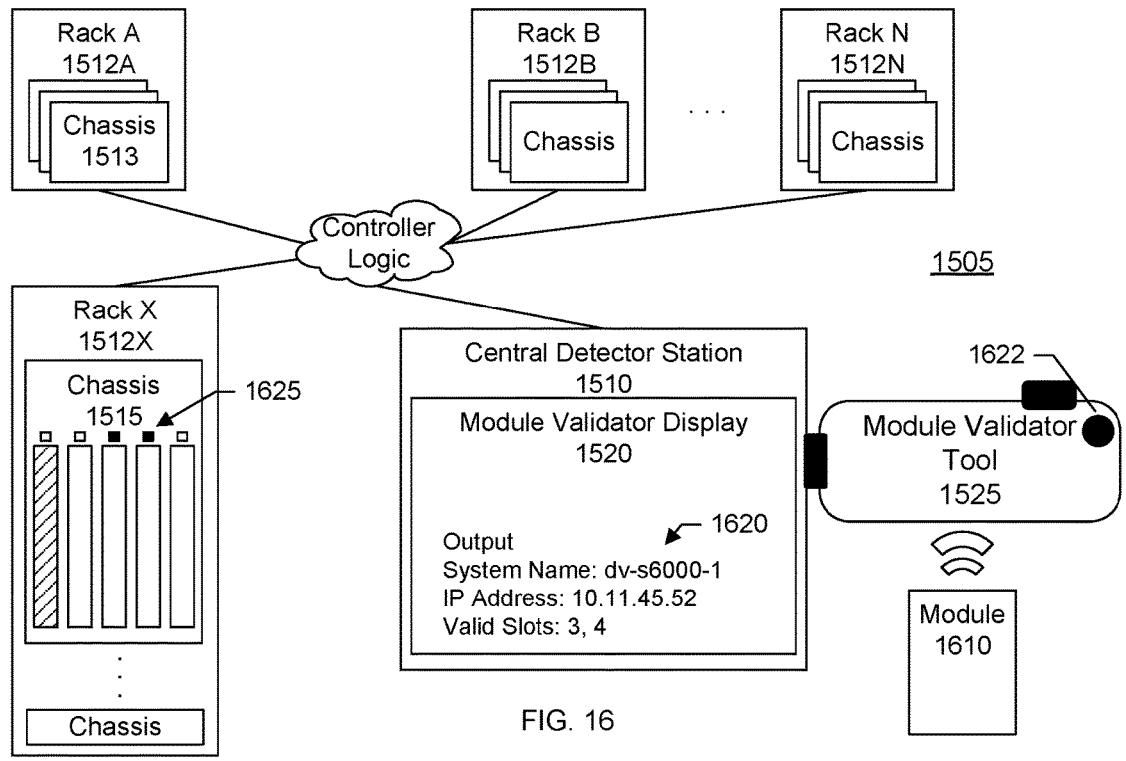
FIG. 16 shows a block diagram of the module validation system shown in FIG. 15 showing the results of the support and compatibility check according to a specific embodiment.

FIGS. 15 and 16 show an example of a central detector station form factor according to another specific embodiment. In this specific embodiment, a module validation system is provided at a central detector station. Specifically, a central station performs the detection task for a given chassis and relays the results back to the chassis. In a specific embodiment, there is a central controller in the cloud that stores or possesses knowledge about all participating chassis in the area and can collect and store all static and dynamic restrictions about the various systems in an area. When the user wants to find the compatibility status for a given module against a given chassis, the central controller completes the required tasks and generates an appropriate response on the central station as well as the chassis in question.

FIGS. 15 and 16 shows first and second states, respectively, of a module checking operation. Specifically, a data center 1505 includes a central detector station 1510 and any number of racks 1512A-N. Each rack holds any number of chassis 1513 that may be connected to the central detector station via a network of the data center.

In an embodiment, the central detector station provides a central location to configure and manage the various chassis. The central detector station may include a general purpose computer including, for example, a display or electronic screen 1520, and an input device (e.g., keyboard). Platform information and configuration information for each chassis may be stored at the central detector station.

To check a module, the user inserts a portable module validation tool 1525 into a receptacle (e.g., USB port) at the central detector station, inputs an identifier (e.g., IP address) 1530 of a chassis 1515 in a rack X 1512X that the user wishes to check, presses a button 1535 on the tool to activate the tool, and brings a module 1610 (FIG. 16) near the validation tool.

The module validator receives the information about the module from the attached tag. Configuration and platform information responsive to the chassis the user wishes to check is retrieved, such as from a database or other central responsibility, and the information is analyzed. In this example, the module is determined to be supported by the chassis platform and compatible with the current configuration of the chassis.

As shown in FIG. 16, a result of the analysis may be outputted 1620 to the display. The result may include an identification of the valid slots (e.g., slots 3 and 7), and a checker light (e.g., status LED) 1622 on the tool may be activated to indicate support by the platform and compatibility with the current configuration (e.g., green LED activated). Further, the central detector station generates a command to the chassis to request that beacon LEDs 1625 of the chassis corresponding to valid slots 3 and 4 be activated. The user may then walk over to the chassis and insert the module into one of slots 3 or 4.

Figure 17:
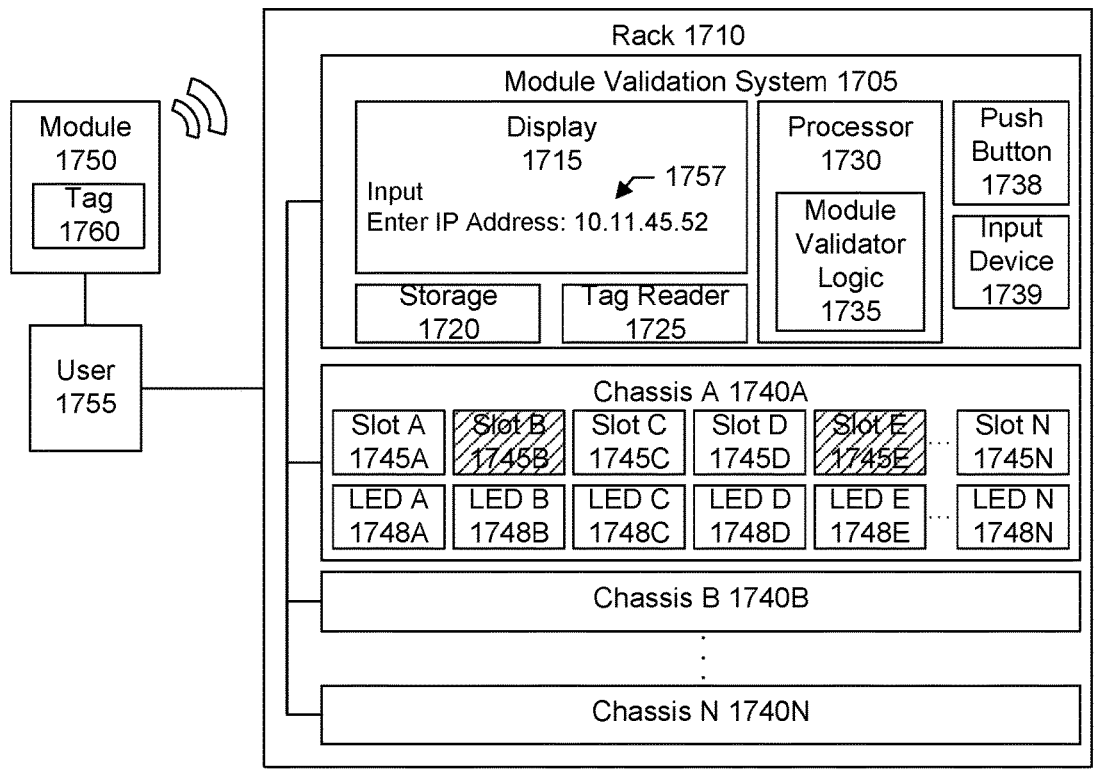
FIG. 17 shows a block diagram of a module validation system being integrated with a rack according to a specific embodiment.
Figure 18:
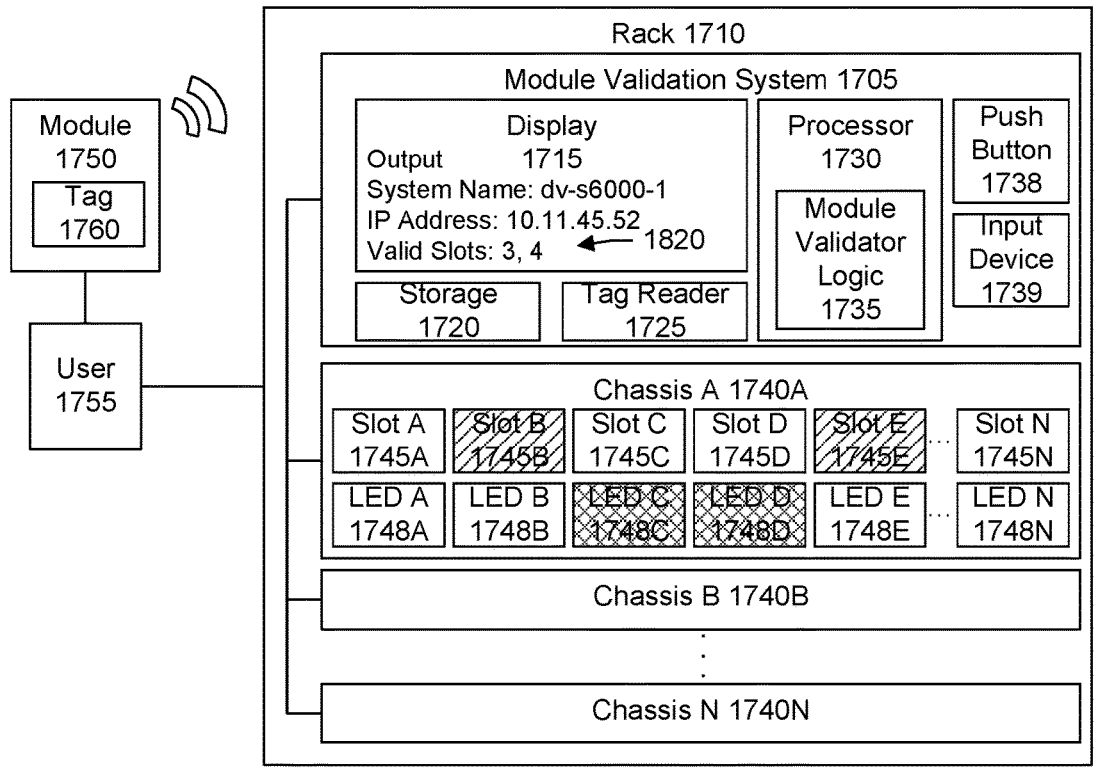
FIG. 18 shows a block diagram of the module validation system shown in FIG. 17 showing the results of the support and compatibility check according to a specific embodiment.

FIGS. 17 and 18 shows an example of a rack form factor according to another specific embodiment. In this specific embodiment, a module validation system 1705 is built into a rack 1710. The rack may be referred to as a hyper-converged rack or a smart rack. FIGS. 17 and 18 show first and second states, respectively, of a module checking operation. The module validation system includes a display 1715, storage 1720, tag reader 1725, processor 1730 with validation logic 1735, push button 1738, and input device 1739. The rack includes chassis 1740A-N that are connected to the module validation system. In the example shown in FIG. 17, slots 1745A, C, and D of chassis 1740 are empty. Slots 1745B and E contain modules as indicated by the fill pattern.

The storage may store the platform information or specification, and chassis configuration information for each of the chassis units present in the rack. The input device may include a keyboard. Instead or additionally, the input device may be integrated with the display (e.g., touch screen display).

To test or check support and compatibility between a chassis 1740A and a module 1750, a user 1755 holds the module, approaches the rack, inputs via the input device an identifier 1757 (e.g., IP address) of the chassis, pushes the push button to activate the tag reader, and brings the module within range of the tag reader. The tag reader acquires information about the module from a tag 1760 attached to the module. The validator logic retrieves the platform specification and current chassis configuration information responsive to the chassis to be checked. The information about the module is analyzed against the platform specification, and current hardware and software configuration of the chassis and the analysis results outputted.

FIG. 18 shows an example of the output. In this example, the module has been determined to be supported and compatible with slots 3 and 4 of the chassis. The output may include outputting to the display an identification 1820 of the compatible slots and activating beacon LEDs associated with the compatible slots (e.g., beacon LEDs 1748C and 1748D corresponding to slots 1745C (slot 3) and 1745D (slot 4)). The activation of the beacon LEDs is shown by the cross-hatching fill pattern.

Figure 19:
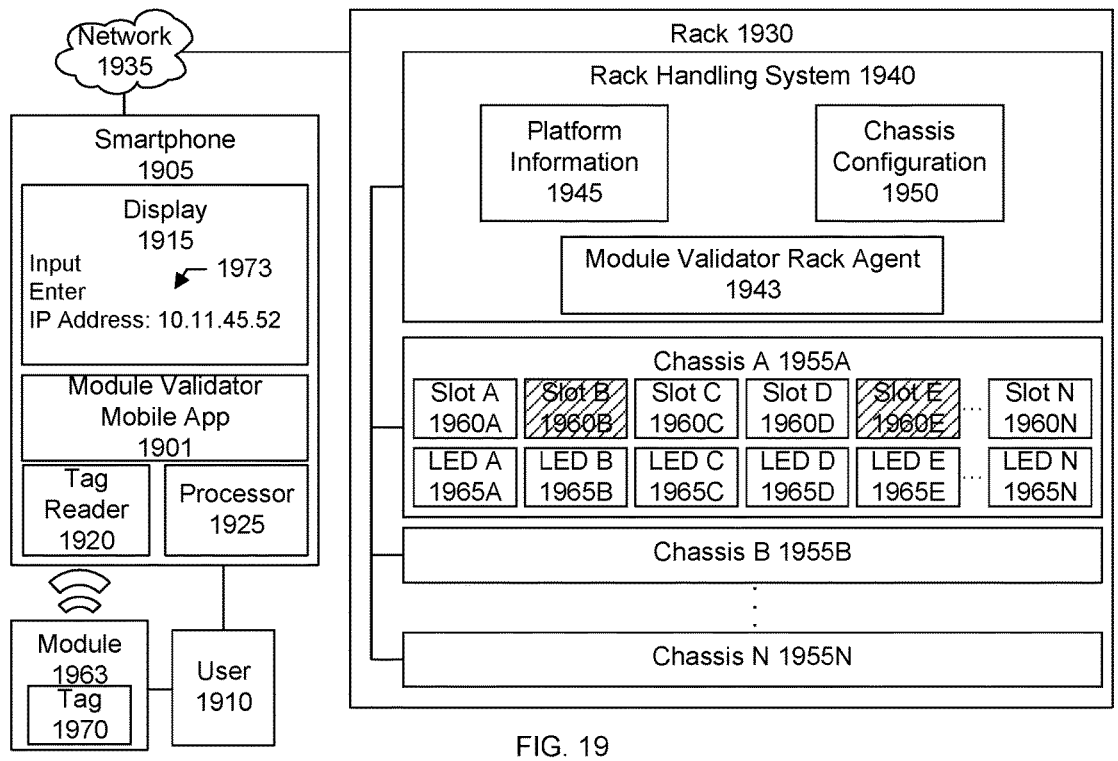
FIG. 19 shows a block diagram of a module validation system being implemented as a mobile application program according to a specific embodiment.
Figure 20:
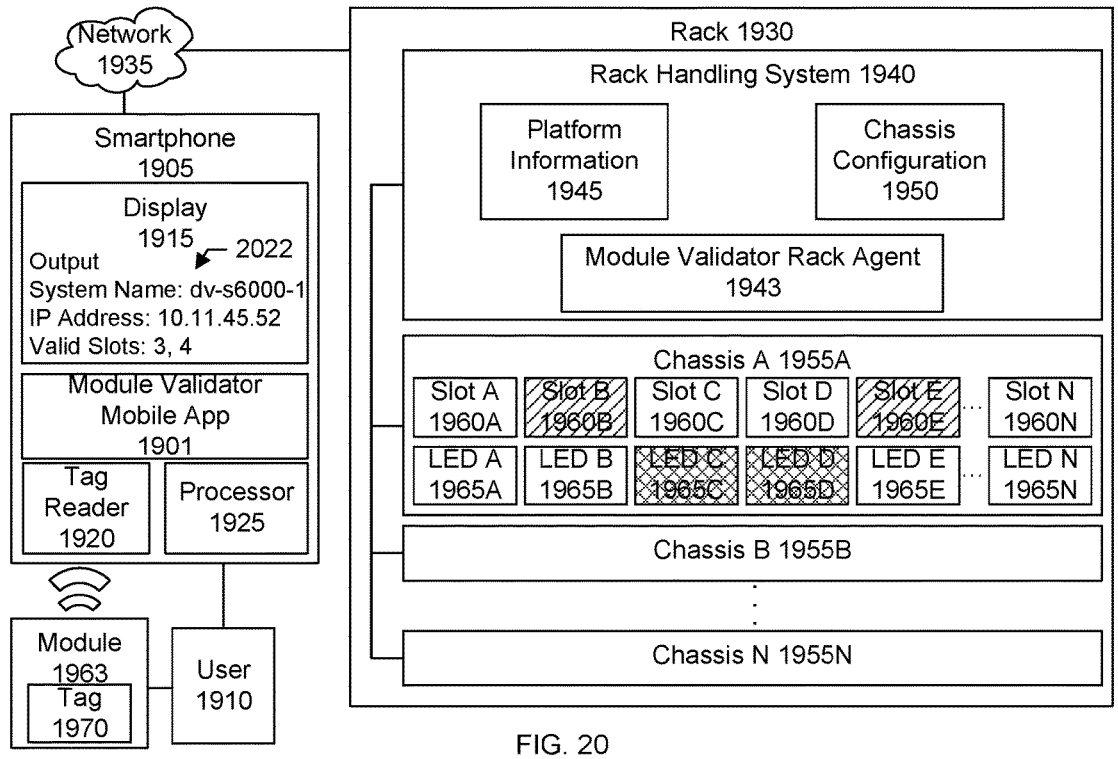
FIG. 20 shows a block diagram of the module validation system shown in FIG. 19 showing the results of the support and compatibility check according to a specific embodiment.

FIGS. 19-20 show an example of smartphone form factor according to another specific embodiment. In this specific embodiment, a module validation system is implemented as a mobile application program or app 1901 that can be installed on a mobile device (e.g., smartphone) 1905 of a user 1910. FIGS. 19-20 show first and second states, respectively, of a module checking operation. The smartphone includes a display 1915, tag reader 1920, processor 1925, storage, network interface, battery, antenna, operating system (OS) (e.g., iOS as provided Apple or Android as provided by Google), and so forth. Some examples of smartphones include iPhone from Apple, Galaxy from Samsung, and others.

The smartphone may be connected to a rack 1930 via a network 1935. The rack may include a rack handling system 1940. The rack handling system may include a module validator rack agent 1943 and stores platform information 1945 and chassis configurations 1950 for each of chassis 1955A-N in the rack. The validator rack agent coordinates with the validator mobile app to check compatibility between a module and chassis of the rack. In the example shown in FIG. 19, slots 1960A, C, and D of chassis 1960A are empty. Slots 1960B and E contain modules as indicated by the diagonal fill pattern.

To test or check support and compatibility between chassis 1955A and a module 1963, the user approaches the rack, launches the module validator app such as by selecting or double tapping an icon displayed on the screen and associated with the app. The smartphone connects to the rack via the network. The user inputs via the validator mobile app an identifier 1973 (e.g., IP address) of the chassis. The validator mobile app directs the operation of the tag reader which acquires information about the module from a tag 1970 attached to the module. The validator mobile app communicates with the validator rack agent to obtain the platform information and configuration of the chassis to be checked. The agent passes the information to the validator mobile app. The app analyzes the information received from the module and rack agent. The app then outputs results of the analysis.

FIG. 20 shows an example of the output. In this example, similar to the example shown in FIG. 18, the module has been determined to be supported and compatible with slots 3 and 4 of the chassis. The output may include outputting to the display an identification 2022 of the supported and compatible slots and passing commands to the rack agent to activate beacon LEDs associated with the compatible slots (e.g., beacon LEDs 1965C and 1965D corresponding to slots 1965C (slot 3) and 1965D (slot 4)). The activated beacon LEDs are indicated by the cross-hatching fill pattern.

Below are some examples of use cases highlighting some benefits of the module validation system in various embodiments.

Use Case 1: Slot Compatibility Detector

Some chassis or switches, such as the Dell S5000 networking switch or platform as provided by Dell, have utility side slots for a PSU and fan trays that are identical in mechanical dimensions but have following restrictions:

1) PSUs can be inserted in any slot; and

2) Fan Tray can only be inserted in the second and/or third slot due to thermal requirements.

In this use case example, the module validation system can be used to indicate to the user which slots are acceptable depending on whether the module to be inserted is a PSU or fan tray. For example, when checking the compatibility of the PSU, the checker tool indicator light or status LED may turn green and beacon LEDs for the relevant slots may be lit. When checking the compatibility of a fan tray, the checker tool indicator light or status LED may likewise turn green, but only beacon LEDs for the second and third slots may be lit.

In an embodiment, a method includes retrieving information about a chassis, the information comprising first and second restrictions, the first restriction specifying that a power supply unit (PSU) may be inserted into any slot of the chassis, and the second restriction specifying that a fan tray may be inserted into only a subset of the slots; detecting, based on a tag attached to a module, that the module is one of the PSU or fan tray; if the module detected is the PSU, activating beacon LEDs for each slot of the chassis, while also activating another LED, separate from the beacon LEDs, to indicate that the PSU is supported by the chassis; and if the module detected is the fan tray, activating beacon LEDs for only the subset of slots, while also activating the other LED to indicate that the fan tray is supported by the chassis, wherein during the detecting, the module is outside of the chassis.

Use Case 2: Forward/Reverse Airflow Compatibility Detector

Some chassis or switches, such as the Dell Networking top-of-rack (ToR) platforms S4810, S5000, S6000, and others, have stock keeping units (SKUs) for PSUs and fan trays with forward and reverse airflows. The restriction includes using all PSUs and fan trays of either forward or reverse airflow at the same time without mixing and matching or having a combination of both forward and reverse airflow type modules installed simultaneously or concurrently. There is no easy way to discern if a given module has a forward or reverse airflow. It can be very time consuming for users to insert a module and wait for the system to detect the error and display an appropriate console message to determine the issue.

With the module validation system, if a reverse airflow fan tray is tested in an otherwise forward airflow platform, the status LED would turn orange indicating that even though module is supported by the platform, the module shouldn't be inserted in this particular case due to a misconfiguration. This provides an instantaneous feedback that doesn't require referring to any documentation and/or console log.

In a specific embodiment, a method includes obtaining information about a chassis, the information comprising a restriction indicating that all installed modules be configured to have airflows in a first direction, and an indication that modules of a first type are supported; without having to insert a module into the chassis, collecting information about the module by reading a tag attached to the module;

analyzing the information about the module against the information about the chassis; determining that the module is of the first type, but that the module is configured to have an airflow in a second direction, opposite the first direction; and upon the determination, not activing beacon LEDs associated with slots of the chassis while activating another LED, separate from the beacon LEDs, to indicate that although the module is supported, the module is not compatible.

Use Case 3: Input/Output Module (TOM) Compatibility Detector

Some chassis, present some unique compatibility issues for certain IOM modules based on some initial conditions. The restriction may be as follows:

1) If no IOM is present, any IOM is allowed; 2) If a high-end IOM is present in a slot, no low-end IOM is allowed in adjacent slots; and 3) If a low-end IOM is present in a slot, no high-end IOM is allowed in adjacent slots.

With the module validation system, this restriction can be solved by checking the matrix and visually indicating status. More specifically, in a specific embodiment, a method includes obtaining a plurality of restrictions for a chassis, the plurality of restrictions comprising first, second, and third restrictions, wherein the first restriction specifies that if no input/output module (TOM) is present then any IOM is allowed, the second restriction specifies that if an IOM of a first type is present in a slot then an IOM of a second type, different from the first type, is not allowed in slots adjacent to the slot, and the third restriction specifies that if an IOM of the second type is present in the slot then an IOM of the first type is not allowed in the slots adjacent to the slot; generating a plurality of compatibility matrices for slots of the chassis, wherein a first compatibility matrix for a first slot indicates that an IOM of the second type is not allowed to be inserted into the first slot because an IOM of the first type is present in a second slot, adjacent to the first slot, a second compatibility matrix for a third slot, adjacent to the second slot, indicates that an IOM of the second type is not allowed to be inserted into the third slot, and a third compatibility matrix for a fourth slot, not adjacent to the second slot, indicates that an IOM of the second type is allowed to be inserted into the fourth slot; without having to insert an IOM into the chassis, collecting information about the IOM from a tag attached to the IOM, the information about the IOM indicating whether the IOM is of the first type or the second type; if the IOM is of the first type, activing first, second, and third beacon LEDs associated with the first, third, and fourth slots, respectively; and if the IOM is of the second type, activing the third beacon LED associated with the fourth slot and not activating the first and second beacon LEDs.

Use Case 4: RPM Versus Line Card Slot Compatibility Detector

In some chassis platforms, there are dedicated slots for supervisor cards, line cards, fabric cards, service cards, and so forth. The module validation system can quickly identify any incompatibility and indicate the issue using an LED (or other) visual indicator. There is no need to use color-codes and symbols for individual slots. In a specific embodiment, a method includes obtaining information about a chassis having a plurality of slots, the information specifying that a first slot is dedicated to a card of a first type, and that a second slot is dedicated to a card of a second type, different from the first type; without having to insert a card into a slot of the plurality of slots, reading a tag coupled to the card to identify the card as being one of the first or second type; if the card is of the first type, activating a first beacon LED associated with the first slot, not activating a second beacon LED associated with the second slot, and activing another LED, different from the first and second beacon LEDs, in a first color to indicate that there is at least one slot in which the card is compatible; and if the card is of the second type, activating the second beacon LED, not activating the first beacon LED, and activing the other LED in the first color.

Use Case 5: Hardware Rev Compatibility Detector

In an embodiment, the module validation system can be used to weed out prototype modules and old revision modules from a production system by installing hardware revision in NFC tag and checking it before declaring "supported." In a specific embodiment, a method includes obtaining information about a chassis having a plurality of slots to receive modules, the information comprising revision requirements for the modules; prior to a module being inserted into a slot, reading a tag coupled to the module to identify a revision number of the module; comparing the revision number to the revision requirements; and based on the comparing, determining whether the module is or is not supported.

Use Case 6: Slot Pre-Provisioning in Chassis Environment

In an embodiment, for fast deployment, enterprise and data-center operators may employ the functionality of software configuration pre-provisioning, if supported by the network operating system. Slots may be pre-configured to accept specific type of cards. In such event, when an unexpected card is inserted, configuration management software may go through a major churn resulting in a waste of time and resources. This problem can be eliminated with the module validation system. In a specific embodiment, a method includes accessing pre-configuration information for a chassis having a plurality of slots, the pre-configuration information specifying acceptable card types for the plurality of slots; without having to insert a card into a slot, reading a tag associated with the card to identify a card type of the card; comparing the card type against the configuration information specifying acceptable card types; if the card type is an acceptable card type, generating a visual indication of the card as being acceptable for use in the chassis; and if the card type is not an acceptable card type, generating a different visual indication of the card as not being acceptable for use in the chassis.

Use Case 7: Ethernet SFP Versus FC SFP Compatibility

Some modules, such as a 1/10G Ethernet Small Form-Factor Pluggable (SFP) module and a 2/4/8/16 FC SFP, are identical in form and can be accepted in a standard SFP cage. If a port is configured in Ethernet mode, insertion of the FC SFP will cause the port to not come up or otherwise fail to operate. The same is true for an Ethernet SFP inserted into a port in FC mode. This problem can be eliminated using the module validation system. In a specific embodiment, a method includes accessing information about a network switch comprising a port capable of accepting first and second types of Small Form-Factor Pluggable (SFP) modules, wherein the first and second types of SFP modules have the same form factor, the first type of SFP module is associated with a first communication standard, and the second type of SFP module is associated with a second communication standard, different from the first communication standard, and wherein the information specifies whether the port is configured in a first mode corresponding to the first communication standard, or configured in a second mode corresponding to the second communication standard; without having to insert an SFP module into the port, reading a tag associated with the SFP module to identify the module as being one of the first or second types of SFP modules; if the port is configured in the first mode and the SFP module is of the first type of SFP modules, generating a notification indicating that the SFP module is compatible with the port; and if the port is configured in the first mode and the SFP module is of the second type of SFP modules, generating a different notification indicating that the SFP module is not compatible with the port.

It should be appreciated that the various embodiments presented in this application may be combined, in any combination, with other embodiments presented in this application. For example, the discussion accompanying FIG. 21 of a module validator dongle having different labels and accompanying separate LEDs to show the different conditions is applicable to the implementation of FIGS. 9-11. That is, in another specific embodiment, a panel of a chassis may include a region having the set of labels and accompanying separate LEDs (as shown in FIG. 21) to indicate the different module support and compatibility conditions.

As another example, the discussion accompanying FIGS. 4-5 of the module validator tool or dongle being plugged into the chassis is applicable to the implementation of FIGS. 17-18. That is, in another specific embodiment, the rack may include a receptacle (e.g., USB receptacle) into which the module validator tool or dongle may be plugged. In this specific embodiment, the rack may or may not include the electronic display.

As discussed above, in various embodiments, there is an NFC reader that reads information about a module from an NFC tag associated with the module without the module needing to be first inserted into a chassis. NFC is desirable because of its relatively low-cost and ease of use. The relatively short reading range of NFC (e.g., about 1, 2, 3, or 4 centimeters between an NFC tag and reader; or almost touching) is desirable because it helps to reduce potential signal interference with other modules also having NFC tags. In other words, the short reading range helps to ensure that a tag of a module will be read only when there is a clear and intended user action to trigger the read.

Thus, for example, the user may be carrying multiple different modules, each having an NFC tag. A user can check the compatibility between a chassis and a particular module by holding that particular module near the NFC reader. The other modules that the user may be carrying will not be read because they will be out of range of the NFC reader. Further, as discussed above, configuration information for the chassis indicates modules that are presently inserted into the chassis. Thus, modules that have already been inserted into the chassis can be distinguished from the particular module that the user wishes to check.

It should be appreciated that NFC is merely one example of a non-contact communication technique. In other embodiments, other non-contact communication techniques may be used such as barcodes and barcode scanners, quick response (QR) codes and cameras, RF tags, other wireless transponder technology, and so forth. For example, referring back now to FIG. 1, the tag attached to the module may include a barcode and the tag reader may include a bar code scanner. Alternatively, the tag attached to the module may include a QR code and the tag reader may include a camera to capture an image of the QR code.

In other embodiments, a module validation system may incorporate voice-recognition, artificial intelligence, or both to trigger a module support and compatibility check. For example, in a specific embodiment, the module validation system may include a microphone, speaker, and logic to detect a user's voice-command to perform the check. In this specific embodiment, the user may approach, for example, a rack having an integrated module validation system and speak a voice command (e.g., "Alice, please check the validity of this module I'm holding in chassis Y.") Upon recognizing the voice command, the module validation system is triggered to read a tag attached to the module and obtain information about module. The module information is compared against the configuration and platform information for the identified chassis in the rack (e.g., chassis Y) and the output may include voice via the speaker (e.g., "That module is compatible with slots 4 and 9 of chassis Y.", "That module is not supported by chassis Y.", or "That module is supported by chassis Y, but there are no empty slots in which the module will be compatible.")

Figure 22:
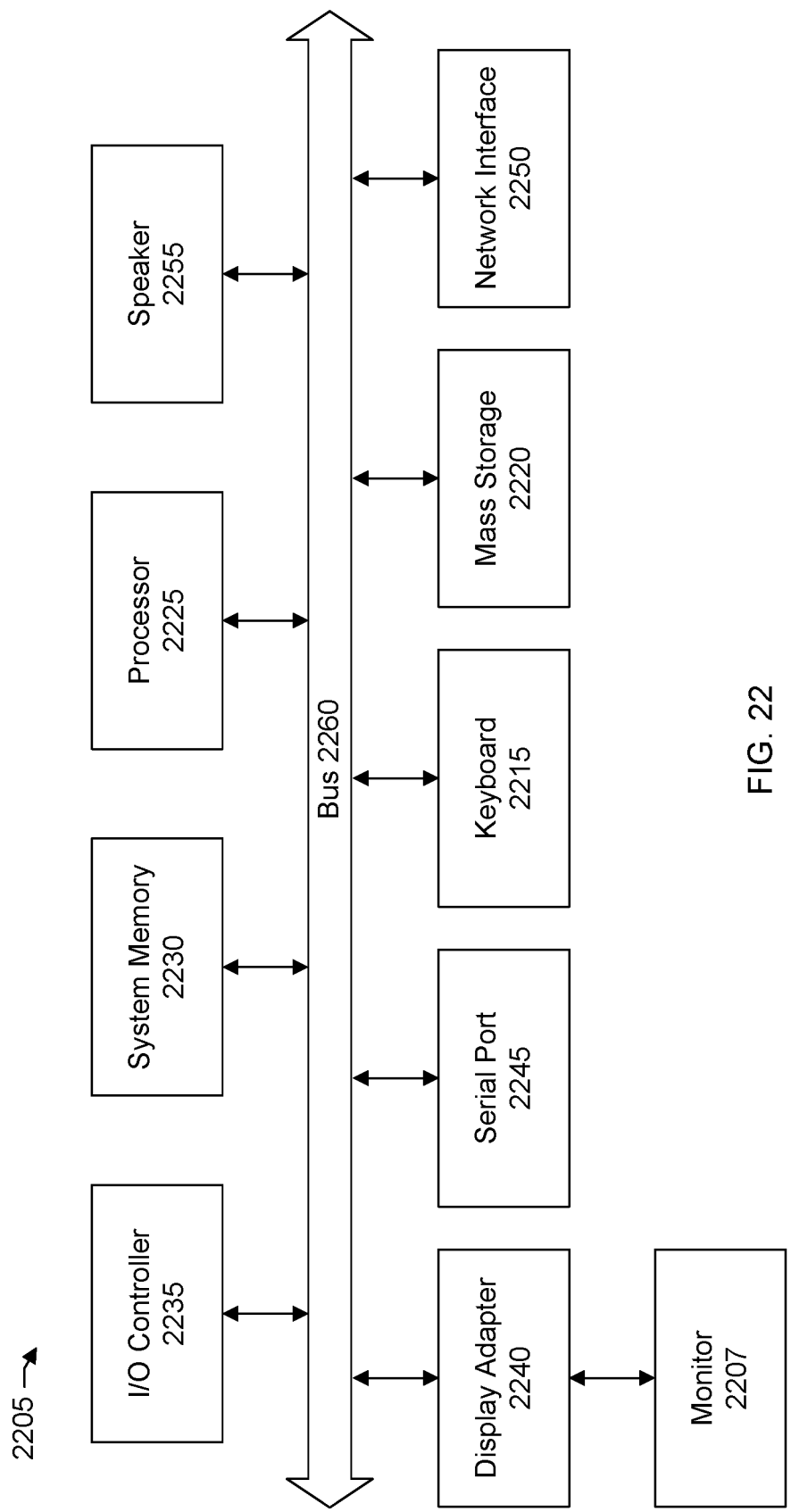
FIG. 22 shows a block diagram of a computer system suitable for use with the system, under some embodiments.

FIG. 22 shows a system block diagram of a computer system 2205 used to execute the software of the present system described herein. The computer system includes a monitor 2207, keyboard 2215, and mass storage devices 2220. Computer system 2205 further includes subsystems such as central processor 2225, system memory 2230, input/output (I/O) controller 2235, display adapter 2240, serial or universal serial bus (USB) port 2245, network interface 2250, and speaker 2255. The system may also be used with computer systems with additional or fewer subsystems. For example, a computer system could include more than one processor 2225 (i.e., a multiprocessor system) or a system may include a cache memory.

Arrows such as 2260 represent the system bus architecture of computer system 2205. However, these arrows are illustrative of any interconnection scheme serving to link the subsystems. For example, speaker 2255 could be connected to the other subsystems through a port or have an internal direct connection to central processor 2225. The processor may include multiple processors or a multicore processor, which may permit parallel processing of information. Computer system 2205 shown in FIG. 22 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

Referring back now to FIG. 1, in a distributed network environment, network 109 may represent a cloud-based network environment in which applications, servers and data are maintained and provided through a centralized cloud computing platform. In an embodiment, there can be a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within the system may be stored in any number of persistent storage locations and devices, such as local client storage, server storage, or network storage, which may at least be partially implemented through storage device arrays, such as RAID components. In an embodiment network 109 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

The system may include general purpose computers including hardware and software components, applications, a processor, memory, storage, network interface, input device, display (e.g., electronic display or screen), and so forth. The system can include any number of servers, clients, and computing nodes.

In a specific embodiment, there is a method for checking support and compatibility of a module without inserting the module into one of one or more empty slots of a chassis comprising: obtaining a platform specification for the chassis; obtaining a configuration of the chassis; receiving information about the module from a Near Field Communication (NFC) tag coupled to the module; analyzing the information about the module against the platform specification, and the chassis configuration; based on the analysis, determining that one of a plurality of conditions exists, wherein the plurality of conditions comprise: a first condition exists when the module will not be supported according to the platform specification; a second condition exists when the module will be supported according to the platform specification and there are no empty slots for which the module will be compatible with the chassis configuration; and a third condition exists when the module will be supported according to the platform specification and there is at least one empty slot for which the module will be compatible with the chassis configuration; and generating an indication, perceptible to a user, of a determined condition to allow the user to decide whether to insert the module.

In an embodiment, the method includes when the first condition exists, not activating beacon light emitting diodes (LEDs) adjacent to the empty slots of the chassis; and activating another LED, separate from the beacon LEDs, wherein the activated other LED indicates that the module is not supported according to the platform specification.

In an embodiment, the method includes when the second condition exists, not activating beacon light emitting diodes (LEDs) adjacent to the empty slots of the chassis; and activating another LED, separate from the beacon LEDs, wherein the activated other LED indicates that the module is supported according to the platform specification, but there are no empty slots for which the module will be compatible with the chassis configuration.

In an embodiment, the method includes when the third condition exists, activating each beacon light emitting diode (LED) adjacent to each of the respective one or more empty slots for which the module will be compatible with the chassis configuration; and activating another LED, separate from the beacon LED, wherein the activated other LED indicates that the module is supported according to the platform specification and there is at least one empty slot for which the module will be compatible with the chassis configuration.

The platform specification may include a listing of modules that are supported by a vendor of the chassis. The platform specification may include a set of restrictions provided by a vendor of the chassis, and the chassis configuration may include a set of restrictions configured by a customer of the vendor. The chassis configuration may include user-configurable hardware and software options for the chassis. During the analyzing the module information, the module is external to or outside of the chassis. The module does not occupy any slot of the chassis.

In another specific embodiment, there is a system for checking support and compatibility of a module while the module remains external to the chassis, the system comprising: a processor-based system executed on a computer system comprising a processor, wherein the processor is configured to: obtain a platform specification for the chassis; obtain a configuration of the chassis; receive information about the module from a Near Field Communication (NFC) tag coupled to the module; analyze the information about the module against the platform specification, and the chassis configuration; based on the analysis, determine that one of a plurality of conditions exists, wherein the plurality of conditions comprise: a first condition exists when the module will not be supported according to the platform specification; a second condition exists when the module will be supported according to the platform specification and there are no empty slots of the chassis for which the module will be compatible with the chassis configuration; and a third condition exists when the module will be supported according to the platform specification and there is at least one empty slot for which the module will be compatible with the chassis configuration; and generate an indication, perceptible to a user, of a determined condition to allow the user to decide whether to insert the module.

In another specific embodiment, there is a computer program product, comprising a non-transitory computer-readable medium having a computer-readable program code embodied therein, the computer-readable program code adapted to be executed by one or more processors to implement a method for checking support and compatibility of a module while the module remains outside of a chassis, the method comprising: obtaining a platform specification for the chassis; obtaining a configuration of the chassis; receiving information about the module from a Near Field Communication (NFC) tag coupled to the module; analyzing the information about the module against the platform specification, and the chassis configuration; based on the analysis, determining that one of a plurality of conditions exists, wherein the plurality of conditions comprise: a first condition exists when the module will not be supported according to the platform specification; a second condition exists when the module will be supported according to the platform specification and there are no empty slots of the chassis for which the module will be compatible with the chassis configuration; and a third condition exists when the module will be supported according to the platform specification and there is at least one empty slot for which the module will be compatible with the chassis configuration; and generating an indication, perceptible to a user, of a determined condition to allow the user to decide whether to insert the module.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for checking support and compatibility of a module without inserting the module into one of one or more empty slots of a chassis comprising:
    obtaining a platform specification and a configuration of the chassis;
    receiving information about the module from a Near Field Communication (NFC) tag coupled to the module;
    analyzing the information about the module against the platform specification, and the chassis configuration;
    based on the analysis, determining that one of a plurality of conditions exists, wherein the plurality of conditions comprise:
        a first condition exists when the module will not be supported according to the platform specification;
        a second condition exists when the module will be supported according to the platform specification and there are no empty slots for which the module will be compatible with the chassis configuration; and
        a third condition exists when the module will be supported according to the platform specification and there is at least one empty slot for which the module will be compatible with the chassis configuration; and
    generating an indication, perceptible to a user, of a determined condition to allow the user to decide whether to insert the module.

2. The method of claim 1 comprising when the first condition exists,
    not activating beacon light emitting diodes (LEDs) adjacent to the empty slots of the chassis; and
    activating another LED, separate from the beacon LEDs, wherein the activated other LED indicates that the module is not supported according to the platform specification.

3. The method of claim 1 comprising when the second condition exists,
    not activating beacon light emitting diodes (LEDs) adjacent to the empty slots of the chassis; and
    activating another LED, separate from the beacon LEDs, wherein the activated other LED indicates that the module is supported according to the platform specification, but there are no empty slots for which the module will be compatible with the chassis configuration.

4. The method of claim 1 comprising when the third condition exists,
    activating each beacon light emitting diode (LED) adjacent to each of the respective one or more empty slots for which the module will be compatible with the chassis configuration; and
    activating another LED, separate from the beacon LED, wherein the activated other LED indicates that the module is supported according to the platform specification and there is at least one empty slot for which the module will be compatible with the chassis configuration.

5. The method of claim 1 wherein the platform specification comprises a listing of modules that are supported by a vendor of the chassis.

6. The method of claim 1 wherein during the analyzing the module information, the module is external to the chassis.

7. A system for checking support and compatibility of a module while the module remains external to the chassis, the system comprising:
    a processor-based system executed on a computer system comprising a processor, wherein the processor is configured to:
        obtain a platform specification and a configuration for the chassis;
        receive information about the module from a Near Field Communication (NFC) tag coupled to the module;
        analyze the information about the module against the platform specification, and the chassis configuration;
        based on the analysis, determine that one of a plurality of conditions exists, wherein the plurality of conditions comprise:
            a first condition exists when the module will not be supported according to the platform specification;
            a second condition exists when the module will be supported according to the platform specification and there are no empty slots of the chassis for which the module will be compatible with the chassis configuration; and
            a third condition exists when the module will be supported according to the platform specification and there is at least one empty slot for which the module will be compatible with the chassis configuration; and
        generate an indication, perceptible to a user, of a determined condition to allow the user to decide whether to insert the module.

8. The system of claim 7 wherein the processor is configured to:
    when the first condition exists,
    not activate beacon light emitting diodes (LEDs) adjacent to the empty slots of the chassis; and
    activate another LED, separate from the beacon LEDs, wherein the activated other LED indicates that the module is not supported according to the platform specification.

9. The system of claim 7 wherein the processor is configured to:
when the second condition exists,
not activate beacon light emitting diodes (LEDs) adjacent to the empty slots of the chassis; and
activate another LED, separate from the beacon LEDs, wherein the activated other LED indicates that the module is supported according to the platform specification, but there are no empty slots for which the module will be compatible with the chassis configuration.

10. The system of claim 7 wherein the processor is configured to:
when the third condition exists,
activate each beacon light emitting diode (LED) adjacent to each of the respective one or more empty slots for which the module will be compatible with the chassis configuration; and
activate another LED, separate from the beacon LED, wherein the activated other LED indicates that the module is supported according to the platform specification and there is at least one empty slot for which the module will be compatible with the chassis configuration.

11. The system of claim 7 wherein the chassis configuration comprises user-configurable hardware and software options for the chassis.

12. The system of claim 7 wherein during the analysis, the module is outside of the chassis.

13. A computer program product, comprising a non-transitory computer-readable medium having a computer-readable program code embodied therein, the computer-readable program code adapted to be executed by one or more processors to implement a method for checking support and compatibility of a module while the module remains outside of a chassis, the method comprising:
obtaining a platform specification and a configuration of the chassis;
receiving information about the module from a Near Field Communication (NFC) tag coupled to the module;
analyzing the information about the module against the platform specification, and the chassis configuration;
based on the analysis, determining that one of a plurality of conditions exists, wherein the plurality of conditions comprise:
a first condition exists when the module will not be supported according to the platform specification;
a second condition exists when the module will be supported according to the platform specification and there are no empty slots of the chassis for which the module will be compatible with the chassis configuration; and
a third condition exists when the module will be supported according to the platform specification and there is at least one empty slot for which the module will be compatible with the chassis configuration; and
generating an indication, perceptible to a user, of a determined condition to allow the user to decide whether to insert the module.

14. The computer program product of claim 13 wherein the method comprises:
when the first condition exists,
not activating beacon light emitting diodes (LEDs) adjacent to the empty slots of the chassis; and
activating another LED, separate from the beacon LEDs, wherein the activated other LED indicates that the module is not supported according to the platform specification.

15. The computer program product of claim 13 wherein the method comprises:
when the second condition exists,
not activating beacon light emitting diodes (LEDs) adjacent to the empty slots of the chassis; and
activating another LED, separate from the beacon LEDs, wherein the activated other LED indicates that the module is supported according to the platform specification, but there are no empty slots for which the module will be compatible with the chassis configuration.

16. The computer program product of claim 13 wherein the method comprises:
when the third condition exists,
activating each beacon light emitting diode (LED) adjacent to each of the respective one or more empty slots for which the module will be compatible with the chassis configuration; and
activating another LED, separate from the beacon LED, wherein the activated other LED indicates that the module is supported according to the platform specification and there is at least one empty slot for which the module will be compatible with the chassis configuration.

17. The computer program product of claim 13 wherein the platform specification comprises a set of restrictions provided by a vendor of the chassis, and the chassis configuration comprises a set of restrictions configured by a customer of the vendor.

18. The computer program product of claim 13 wherein during the analyzing, the module does not occupy any slot of the chassis.

* * * * *